United States Patent [19]

Canter et al.

[11] 4,360,061
[45] Nov. 23, 1982

[54] OIL RECOVERY PROCESS USING POLYMER MICROEMULSION COMPLEXES

[75] Inventors: Nathan H. Canter, Edison; Max L. Robbins, South Orange; Edward G. Baker, Berkeley Heights, all of N.J.

[73] Assignee: Exxon Research and Engineering Co., Florham Park, N.J.

[21] Appl. No.: 136,938

[22] Filed: Apr. 3, 1980

[51] Int. Cl.³ ............................................. E21B 43/22
[52] U.S. Cl. .................................. 166/274; 166/273; 252/8.55 D
[58] Field of Search ................ 252/8.55 D; 166/274, 166/275, 273

[56] References Cited

U.S. PATENT DOCUMENTS

| | | | |
|---|---|---|---|
| 3,282,337 | 11/1966 | Pye | 166/274 |
| 3,343,597 | 9/1967 | Gogarty et al. | 166/274 X |
| 3,692,113 | 9/1972 | Norton et al. | 166/275 |
| 3,704,990 | 12/1972 | Sarem et al. | 166/273 |
| 3,739,848 | 6/1973 | Lawson et al. | 166/274 |
| 3,827,496 | 8/1974 | Schroeder | 166/274 X |
| 3,882,939 | 5/1975 | McAtee et al. | 166/274 |
| 3,885,628 | 5/1975 | Reed et al. | 166/252 |
| 3,915,230 | 12/1975 | Flournoy et al. | 166/252 |
| 3,919,092 | 11/1975 | Norton et al. | 252/8.55 D |
| 3,946,811 | 3/1976 | Norton et al. | 166/274 |
| 3,983,940 | 10/1976 | Carpenter et al. | 116/273 |
| 4,016,932 | 4/1977 | Kalfoglou | 166/303 |
| 4,124,073 | 11/1978 | Wier | 166/272 |

FOREIGN PATENT DOCUMENTS 1162414 8/1969 United Kingdom .

OTHER PUBLICATIONS

Cabane, *J. Phys. Chem.*, vol. 81, No. 17, 1977 pp. 1639–1645.
Shirahama, *Colloid and Polymer Sci.*, vol. 252, 1974, pp. 978–981.

*Primary Examiner*—Herbert B. Guynn
*Attorney, Agent, or Firm*—James H. Takemoto

[57] ABSTRACT

A process for the enhanced recovery of oil from a subterranean formation using a polymer-microemulsion complex is disclosed. The polymer is polyethylene oxide or polyvinyl pyrrolidone and interacts with the surfactant of the microemulsion to form a physical association. The resulting complex is characterized by a complexation energy of at least 2 Kcal/mole. Slugs containing the present polymer-microemulsion complexes are stable at high salinity, show reduced destabilization due to surfactant adsorption and retention by the formation, have low interfacial tensions and achieve an early banking, as well as increased displacement of crude oil.

24 Claims, 12 Drawing Figures

OIL RECOVERY PROCESS USING POLYMER MICROEMULSION COMPLEXES

BACKGROUND OF THE INVENTION

1. Field of the Invention

This invention relates to polar polymers and microemulsions for the chemically enhanced recovery of oil. More particularly, the invention relates to polymer-microemulsion complexes in which the polymer is complexed with the surfactant in the microemulsion and a method of using the complexes for the secondary or tertiary recovery of crude oil.

2. Description of the Prior Art

Substantial amounts of crude oil remain trapped in subterranean formations after primary recovery techniques, which rely on the initial formation pressure for production have been completed. Efforts to recover additional amounts of oil involve secondary and tertiary techniques. A common secondary technique involves water flooding or the injection of an aqueous solution under high pressure to displace oil. Water flooding, however, results in the formation of discontinuous globules of oil which are trapped within the formation by capillary forces. In order to release this trapped or residual oil, it is necessary to contact residual oil with a fluid which will interact with the oil causing it to be displaced. This chemically enhanced recovery technique requires a substantial reduction in the interfacial tension between oil and water to values less than ~0.1 dyne/cm.

One method of lowering interfacial tension utilizes microemulsions which contain an oil, water or brine and sufficient amounts of one or more surfactants to solubilize the oil in the brine. While microemulsions have been used to displace residual oil, their effectiveness remains limited by several factors. First, typical microemulsions have low viscosities. When a less viscous fluid is used to displace a more viscous fluid, an instability known as fingering is created at the fluid interface which results in decreased productivity due to an unfavorable mobility ratio. Second, the surfactant is frequently adsorbed by the formation, which results in loss of the microemulsion bank or microemulsion destabilization due to loss of surfactant. Alternatively, one or more components of the surfactant system can be selectively adsorbed by the formation. This chromatographic action tends to shift the hydrophilic-lipophilic balance (HLB) in the surfactant system which can lead to a destabilization or shift to a region of higher interfacial tension on the oil-water-surfactant phase diagram. Third, the effectiveness of any given microemulsion system is often limited by a failure to "bank oil" early in the production process, i.e., soon after injection into the oil field.

U.S. Pat. Nos. 3,282,337 and 3,692,113 disclose that polyethylene oxide can be used as a thixotropic agent for increasing the viscosity of injection water, thus improving the mobility ratio. It is known from U.S. Pat. No. 3,915,230 to use a viscosity increasing hydrophilic polymer solution of optimal salinity and hardness as a preflush for displacing formation water to enhance the action of a subsequently injected surfactant. U.S. Pat. No. 3,704,990 also discloses a water soluble polymer preflush.

When surfactant adsorption is or is expected to be a problem, U.S. Pat. No. 4,016,932 teaches the use of various inorganic or organic sacrifical adsorption agents. Hydrophilic polymers may also be added as viscosity increasing additives.

With respect to the effect of polyethylene oxide and related polymers on other aspects of the rheological properties of fluids used in chemically enhanced oil recovery, U.S. Pat. No. 3,946,811 discloses that the deleterious effects of divalent and trivalent cations can be minimized by employing a polyalkene oxide preslug. It was considered likely that the polyvalent cations formed weak bonds with dipolar sites on the polymer molecule. British Pat. No. 1,162,414 teaches that polyethylene oxide and petroleum sulfonates provide a composition with substantially Newtonian characteristics at low shear rates and dilatant characteristics at high shear rates, and U.S. Pat. No. 3,882,939 describes a polyalkylene oxide polymer complexed with a resin such as a lignosulfonate. U.S. Pat. No. 4,124,073 teaches that thiourea functions as a solution viscosity stabilizer in aqueous compositions comprising thiourea, nonionic linear or branched polyalkylene oxides such as polyethylene oxide and anionic surfactants. Example III is directed to a Berea core test.

Finally, B. Cabane (J. Phys. Chem., 81, 1639 (1977)) in a paper entitled, "Structure of Some Polymer-Detergent Aggregates in Water," discussed the interaction of polyethylene oxide and sodium dodecyl sulfate. The author concluded that the polymer/sulfonate aggregate was a mixed micelle in which the local structure was determined by the strong forces between the detergent molecules while the polymer is weakly adsorbed on the surface of the micelle. K. Shirahama (J. Colloid & Polymer Sci., 252, 978 (1974)) has determined that polyethylene oxide complexes with sodium dodecyl sulfate by ion-dipole forces to the ether oxygen. The reported bond strength is in the order of 6 Kcal/mole and the interaction is molecular weight dependent such that no association energy is observed below about a molecular weight of 4,000.

It would be highly desirable to have a chemically enhanced oil recovery process which is stable at high salinity, shows reduced adsorption and retention and achieves an early banking of as well as increased production of crude oil.

SUMMARY OF THE INVENTION

It has been discovered that the above and other advantageous criteria for enhanced oil recovery can be achieved by a microemulsion if the surfactant of the microemulsion is complexed with polar water-soluble polymers. The present process for recovering crude oil from a subterranean formation comprises injecting into the formation a stabilized microemulsion system which contains a polymer-microemulsion complex in an amount effective to displace oil, said microemulsion system comprising a microemulsion containing an oil, water having up to 25% by weight of dissolved inorganic salts and an amount greater than the critical micelle concentration of at least one surfactant balanced to form the microemulsion, and from 0.1 to 10% by weight, based on the microemulsion, of a polar polymer capable of forming a polymer-microemulsion complex, the polymer-microemulsion complex being characterized by a complexation energy of at least 2 Kcal/mole, driving the microemulsion system through the formation to displace oil and recovering the resultant crude oil. The polar polymer is preferably selected from the group consisting of polyethylene oxide, polyvinyl pyrrolidone and copolymers thereof. The polymers may be linear or branched and are homopolymers or copolymers. The copolymers may preferably contain from 75 to 99.5 mole % of ethylene oxide or polyvinyl pyrrolidone and from 0.5 to 25 mole % of a comonomer such as styrene, isoprene, bisphenol-A or propylene oxide.

The polymer-microemulsion complexes are stable with dilution and salinity changes including high absolute salinities, reduce adsorption and retention on formation rocks, sands and clays thereby minimizing surfactant loss, lower interfacial tension and achieve retentions in sand packs and cores as low as 0.1 mg/gm sand, typically about 0.3 mg to 0.75 mg of surfactant/gm of sand at high salinities. While conventional enhanced oil recovery processes usually require a separate thickening agent for mobility control, such an agent is optional in the present invention. By properly regulating the hydrophilic-lipophilic balance (HLB) of the surfactant system, cratering can be controlled and the HLB is also stabilized against dilution and/or salinity changes. Furthermore, early banking of oil can be achieved and oil recovery improved.

DETAILED DESCRIPTION OF THE INVENTION

Figure 1:
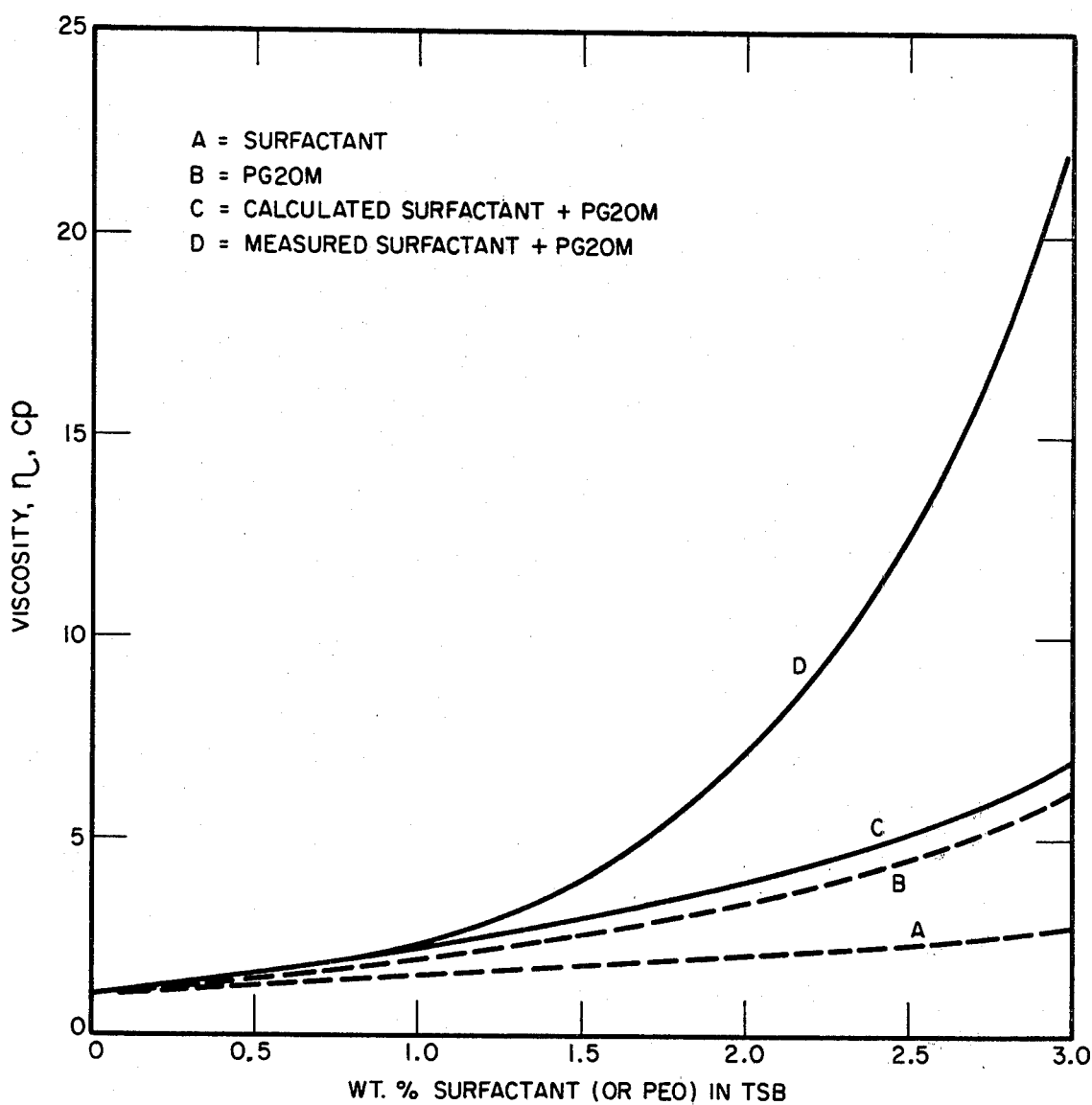
FIG. 1 is a graph demonstrating the observed and theoretical viscosities resulting from the addition of polymer to a microemulsion.

The term "microemulsion" refers to a stable, transparent or translucent micellar solution or dispersion of oil, water or brine and at least one amphiphilic compound or surfactant. As herein used, "microemulsion" implies no other restrictions with regard to internal microstructure, micelle shape or size, or physical properties. Microemulsions can either be water continuous, oil continuous or bi-continuous. The preferred microemulsions of the invention are predominantly water continuous and comprise an oil, water or salt water and at least one surfactant. The term "microemulsion" also encompasses "birefringent microemulsions," the latter exhibiting the properties of anisotropy and birefringence which are characteristic of liquid crystals. Thus, the present microemulsions broadly comprise micellar formulations which include from 0.3 to 98 wt. % of an oil, 1 to 99 wt. % of water containing up to 25 wt.% of dissolved inorganic salts, 0.2 to 15 wt. % of at least one surfactant and 0.1 to 10 wt. % of a polar polymer capable of forming a polymer surfactant complex and preferably selected from the group consisting of polyethylene oxide, polyvinyl pyrrolidone and copolymers thereof wherein the polar polymer and surfactant form a polymer-surfactant complex characterized by a complexation energy of at least 2 K cal/mole.

The oil may be any refined or crude oil, e.g., a sweet or sour crude, synthetic crude, refined fraction such as kerosene, diesel oil, lube oil, aromatic naphtha or white oil boiling at from 80° to 345° C., $C_6$ to $C_{22}$ aliphatic hydrocarbon aromatic hydrocarbon boiling at from 80° to 300° C. or mixtures thereof. The amount of oil employed can vary over wide ranges of from 0.3 to 98% by weight, based on the microemulsion. Since water continuous microemulsions are preferred, the oils are incorporated in minor amounts of 0.3 to 30%, particularly 0.5 to 15% by weight.

Oil field brines can contain up to 25% by weight, based on water, of dissolved inorganic salts. In addition to NaCl, brines usually contain up to about 10% by weight, based on the total amount of salts presents, of $Ca^{2+}$ and $Mg^{2+}$. Small amounts of other soluble Group I and Group II salts are also frequently present, e.g., $NaHCO_3$, KCl, $BaCl_2$ and the like. Typical brines contain from about 1 to 14 wt.%, based on water, of dissolved salts.

The present polymer-microemulsion complexes are stable in brines containing up to about 25 wt.%, preferably from 1 to about 14 wt.%, of dissolved inorganic salts. The total amount of water in the microemulsions can vary from 1 to 99%, preferably 50 to 99% and particularly from 75 to 98%, by weight, based on the microemulsion.

In order to form a microemulsion, a surfactant or mixture of surfactants must be present in at least an amount effective to form micelles. The amounts of surfactants employed are generally from 0.2 to 15%, preferably from 0.2 to 10% and especially from 0.5 to 6% by weight, based on the microemulsion. Co-surfactants may be present in amounts of from 0 to 15 wt.%., preferably 0.2 to 10 wt.%. Larger amounts are possible but are not usually feasible from an economic standpoint.

The surfactants for polymer-microemulsion complexes may be anionic surfactants or combinations of anionic surfactants with anionic, cationic, nonionic or amphoteric co-surfactants. The choice of the surfactant system is generally predicated upon conditions within the oil field. For example, if high salinities are present, combinations of anionic surfactants with cationic or nonionic co-surfactants may be desirable. Regardless of the particular surfactant system used, the ratio of co-surfactant to anionic surfactant polymer complex must be adjusted or balanced to accomodate the desired salinity and temperature ranges and achieve high oil uptake in the microemulsion and low interfacial tensions vs. oil.

Anionic surfactants and co-surfactants include sulfonates, sulfates, carboxylates, and phosphates which may Another preferred class of cationic surfactants are quaternary ammonium salts. The quaternary salts are usually derived from tertiary amines by reaction with alkyl halides or sulfates. The tertiary amines are those described above, e.g., higher aliphatic, heterocyclic and ethoxylated higher aliphatic.

Amphoteric surfactants usually contain an amino moiety as the basic function and a carboxylic or sulfonic acid as the acidic function. Examples of amino-carboxylic acids are $R^8NHR^9COOH$ where $R^8$ is $C_8$ to $C_{20}$ aliphatic and $R^9$ is $C_1$ to $C_8$ alkyl, $[(R^{10})_3N\text{-}(CH_2)_{1\text{-}5}\text{-}COO^-]$ where $R^{10}$ is $C_1$ to $C_{22}$ aliphatic, condensation products of ethylendiaminetetraacetic acid and fatty acids, and N-alkyl derivatives of aspartic acid. Examples of amino-sulfonic acids are

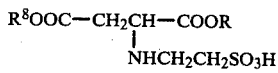

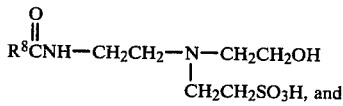

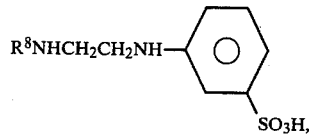

$R^8$ and $R^9$ being defined as above. Imidazole derivaties form another class of amphoterics, i.e.,

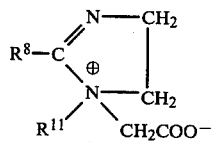

where $R^{11}$ is $C_1$ to $C_8$ alkyl, $C_2H_4OH$ or $C_2H_4NH_2$.

If the anionic surfactants are used in combination with anionic nonionic or cationic co-surfactants, then a preferred surfactant combination contains alkyl or alkylaryl sulfonates or sulfates as the anionic component and ethoxylated aliphatic amines as the cationic or nonionic component. Other preferred combinations include alkyl aryl sulfonates with ethoxylated or sulfated ethoxylated alkanols or alkyl phenols. Especially preferred are alkyl xylene sulfonates with $C_{18}$ ethoxylated amines containing 5–15 EO ($-CH_2CH_2O-$) groups and alkyl xylene sulfonates with ethoxylated or sulfonated ethoxylated di-nonyl phenols containing 8 to 50 EO units. Examples of preferred combinations are i-dodecyl-o-xylene sulfonic acid or sodium salt thereof with ethoxylated octadecyl amine having from 2–15 EO groups and the sodium, ammonium, monoethanolamino, diethanolamino and triethanolamino salts of i-dodecyl-o-xylene sulfonic acid with ethoxylated, sulfated ethoxylated and sulfonated ethoxylated octyl phenol, -nonyl phenol, -dinonyl phenol, -dodecyl phenol and -tridecanol, wherein the number of EO groups ranges from 4 to 50.

The polar polymers are those which can form polymermicroemulsion complexes characterized by a complexation or interaction energy of at least 2 Kcal/mole and are preferably polyethylene oxide, polyvinyl pyrrolidone and copolymers thereof. They are incorporated in an amount from 0.1 to 10% by weight, based on the microemulsion. The molecular weights are from 4,000 to 5,000,000, preferably 10,000 to 500,000 and especially from 15,000 to 160,000. Especially preferred polymers are branched polyethylene oxide, such as a branched condensation product of polyethylene oxide, bisphenol A and epichlorohydrin with the product having about 95 to 98% polyethylene oxide, and linear polyvinyl pyrrolidone.

The formation of a polymer-microemulsion complex is characterized by a relatively strong bond between the polymer and anionic moiety of the surfactant system. The polymer-surfactant interaction results in a complexation energy which is at least 2 Kcal/mole, preferably at least 4 Kcal/mole and particularly from about 5 to 15 Kcal/mole. The complexation energies were determined using isothermal calorimetry techniques by measuring the specific heat of the microemulsions under precisely controlled temperature conditions.

The structure of the polymer is important for certain physical properties of polymer-microemulsion complexes. For example, linear polyethylene oxide can interact with microemulsions at very low salinities. If, however, microemulsion stability at high salinity is desired, then the polyethylene oxide should possess a branched structure. Similarly, in order to reduce static adsorption and dynamic retention, the polyethylene oxide used with the microemulsion should be branched. On the other hand, linear polyvinyl pyrrolidone can substantially reduce adsorption and retention when incorporated into a microemulsion. While not wishing to be bound to any particular theory, it is hypothesized that the most important structural factor within the present polymers is that of overall chain stiffness in the saline media. Branching in polyethylene oxide is one way to achieve chain stiffness.

With regard to selective adsorption and desorption of surfactants (surfactant chromatography) from a surfactant and co-surfactant system, it is possible to add binders in addition to polymers. These materials interact with the surfactant and co-surfactant and bind them together to assist in the inhibition of chromatographic separation.

Binders for anionic surfactants with anionic cosurfactants include polyethylene oxide, polyamines of the formula $NH_2CH_2(CH_2NHCH_2)_nCH_2NH_2$ where $n=0–50$, urea, guanidine or salts thereof. Binders for anionic surfactants with nonionic surfactants are, e.g., sulfated or sulfonated polyethylene oxide, sulfonated polyacrylamide, sulfated amino alkanols or sulfonated alkylamines. Binders for cationic surfactants and co-surfactants may be sulfated glycols and polyols, di- and polycarboxylic acids, poly meta-phosphates and polysilicates. Binders for nonionic surfactants and co-surfactants are di- and polysulfonic acids together with their salts.

The surfactant component of the present microemulsions can be prepared by conventional methods well-known in the art. An extensive review of processes for synthesizing and manufacturing surfactants can be found in "Surface Active Agents and Detergents," Vol. II, Part I by Schwartz et al (Interscience Publishers, 1958), which is incorporated herein.

The microemulsions are also prepared by well-known techniques. Generally, an oil, water or brine and an amount in excess of the critical micelle concentration of a surfactant and a co-surfactant are combined. The be present in the acid or salt form. Sulfonates and sulfates are preferred.

Anionic sulfonates may have the formula $$[R^1-SO_3]^{\ominus}Y^{\oplus}$$

wherein $R^1$ is $C_8$ to $C_{25}$ aliphatic, $C_{14}$ to $C_{36}$ alkylaryl or $R^2-(OCH_2CH_2)_n$ where $R^2$ has the same definition as $R^1$ and n is an integer from 1 to 60, and Y is hydrogen or a monovalent cation such as alkali metal or $N(R^3)_4^{\oplus}$ where each $R^3$ is independently hydrogen, alkyl or hydroxy substituted alkyl, each of 1 to 4 carbon atoms. Preferred alkylaryl include alkylphenyl, alkyltolyl and alkylxylyl having from 8 to 26 carbons in the alkyl. Especially preferred are dodecylbenzene and dodecyl-o-xylene sulfonates. Sulfonated ethoxylated $C_8$ to $C_{26}$ alkylphenols and sulfonated ethoxylated dinonyl phenols containing from 8 to 50 $-CH_2CH_2O-$ groups are preferred anionic co-surfactants. The aliphatic chain in $R^1$ may be interrupted by ester or amide linkages. Anionic surfactants may also be petroleum sulfonates which are derived from the treatment of petroleum oils with strong sulfuric acid.

The anionic sulfate surfactants have the formula $$[R^4-OSO_3]^-Y^+$$

Where $R^4$ is $C_8$ to $C_{25}$ aliphatic, $C_{14}$ to $C_{38}$ alkylaryl or $R^5-(OCH_2CH_2)_n$ where $R^5$ has the same definition as $R^4$ and n is an integer from 1 to 60, and Y is hydrogen, alkali metal cation or $N(R^3)_4^{\oplus}$ where each $R^3$ is independently hydrogen, alkyl of 1 to 4 carbon atoms or hydroxyalkyl of 1 to 4 carbon atoms. The aliphatic chain in $R^4$ may be interrupted by $$\overset{O}{\underset{\|}{-C}}-NH-, \overset{O}{\underset{\|}{-C}}-O-$$

or $-OCH_2CH_2-$ linkages. Examples include sulfated alkanols or sulfated ethoxylated alkanols, especially sulfated ethoxylated $C_{12}-C_{16}$ alkanols.

Also suitable as anionic surfactants are $C_8$ to $C_{30}$ aliphatic carboxylates wherein the aliphatic chain may be interrupted by amido linkages, and aromatic carboxylates such as $C_8$ to $C_{36}$ alkyl substituted benzoic acids. Carboxylates derived from fatty acids are preferred. Other anionics are esters derived from the oxy acids of phosphoric acid such as phosphoric acid, ortho- and polyphosphoric acids. The esters are derived from $C_6$ to $C_{24}$ alkanols and alkylphenols wherein the ester linkage or alkyl chain may be interrupted by ethoxy or amido groups.

Anionic surfactants may also have the formula $$R_aO(C_3H_6O)_m(C_2H_4O)_nYX$$

where $R_a$ is a $C_8$ to $C_{30}$ aliphatic radical or benzene substituted by $C_6$ to $C_{24}$ alkyl or alkenyl, m and n are at least 1 and preferably have average values between about 1 and 10, respectively; Y is sulfate, sulfonate, carboxylate or phosphate and X is a cation. These surfactants are further described in European Patent Application, Publication No. 0003183 A-1.

Nonionic surfactants are ethoxylated derivatives of phenols, amines, carboxylic acids, alcohols and mercaptans, as well as polyhydroxy compounds. The ethoxylated phenols may have the formula $$(R^6)_r-A-[O(CH_2CH_2O)_p]_qH$$

wherein $R^6$ is $C_1$ to $C_{24}$ alkyl, A is benzene, naphthalene or diphenyl, p is 2 to 60, q is 1 or 2 and r is 1 to 5 with the proviso that when r is 1, $R^6$ is at least $C_8$. Preferred nonionic surfactants are ethoxylated $C_8-C_{24}$ alkylphenols, ethoxylated octyl, nonyl or dodecyl phenols containing 8 to 24 $-CH_2CH_2O-$ groups, or ethoxylated dinonyl phenols containing 8 to 50 $-CH_2CH_2O-$ groups.

Ethoxylated amines may be cationic or nonionic depending on the degree of ethoxylation. Higher degrees of ethoxylation render fatty amines nonionic in character. Preferred amines are $C_8$ to $C_{30}$ alkyl amines, $C_8$ to $C_{30}$ ethoxylated amines or quaternary ammonium salts thereof. Ethoxylated amines of the formula $$R^7-N\begin{matrix}(CH_2CH_2O)_xH\\(CH_2CH_2O)_yH\end{matrix}$$

where $R^7$ is a $C_8$ to $C_{30}$ aliphatic radical and the sum of x+y is from 2 to 30 are preferred.

Aliphatic carboxylic acids of from 8 to 30 carbon atoms can be esterified with ethylene oxide to form nonionic surfactants. The degree of ethoxylation may be from 2 to 30. Also, $C_8$ to $C_{25}$ alkanols and mercaptans can be converted to polyethoxy ethers and thio-ethers by reaction with ethylene oxide.

Examples of nonionic surfactants which are not polyethoxylated are esters of sugar alcohols, sorbitol and mannitol. The acid moiety of the ester is generally a fatty acid. Other fatty acid derivatives include esters of di- and poly saccharides and condensates of fatty acids with alkanolamines.

Suitable cationic surfactants are amines, polyamines and quaternary ammonium salts. The amines are higher aliphatic amines of from 8 to 30 carbon atoms and may be primary, secondary or tertiary. Examples of higher aliphatic amines are straight and branched chain alkyl amines, fatty amines and rosin amines. The aliphatic chain may be interrupted by one or more ester, ether or amido linkages. Also suitable are heterocyclic 5 or 6 membered ring systems containing nitrogen and optionally oxygen as hetero atoms and bearing an alkyl group of 8 to 20 carbon atoms. Examples of heterocyclic rings are imidazole, pyrimidine, oxazoline, piperazine and guanadine. The amines may also be di- or triamines derived from fatty amines. Examples of diamines derived from fatty amines are sold under tradename Duomeens by Armak Co.

Preferred cationics are derived from the ethoxylation of higher aliphatic primary or secondary amines with ethylene oxide wherein the degree of ethoxylation is from 2 to 30. Particularly preferred are ethoxylated amines of the formula:

$$C_mH_{2m+1}-N\begin{matrix}(CH_2CH_2O)_uH\\(CH_2CH_2O)_vH\end{matrix}$$

where m is from 8 to 25 and the sum of u+v is from 2 to 20. This type of amine is manufactured by the Armak Co. and sold under the tradename Ethomeen.

ratio of surfactant to co-surfactant is balanced for the desired salinity and temperature. The surfactant and co-surfactant are chosen to maximize the solubilization of the given oil at the desired salinity. Generally, higher salinity requires a more hydrophilic co-surfactant.

The surfactant is chosen from a group having an optimal salinity less than the desired salinity whereas the co-surfactant is chosen from a group having an optimal salinity greater than the desired salinity. The optimal salinity of a surfactant is defined as that salinity at which water and oil uptake are equal in a microemulsion containing the specified oil at the specified temperature. The ratio of surfactant to co-surfactant is adjusted to accomodate the desired salinity, temperature, oil composition, surfactant composition, oil:water ratio and polymer concentration in the microemulsion such that the system is a single transparent or translucent phase which is stable to gravity settling. Under some conditions, the resulting microemulsion may be a "birefringent microemulsion," i.e., it may exhibit anisotropy and birefringence which are characteristics of liquid crystals.

If the microemulsion is based on surfactant systems containing ethoxylated amines and is to be contacted with materials on which the surfactants might adsorb, e.g., sandstones and clays, it is preferred to pretreat the surfactant prior to formation of the polymer-microemulsion complex. The pretreatment involves dissolving the surfactant system to be used in water solution representative of the microemulsion continuous phase, e.g., Tar Springs Brine (TSB) or mixtures of TSB and water, and contacting this solution with a large excess, e.g., 50/1 sand to surfactant, of crushed Berea or similar sand. The recovered surfactant is then used to prepare microemulsions. Tar Springs Brine is a high salinity brine containing 9.2 wt.% NaCl, 0.8 wt.% $CaCl_2$, 1.0 wt% $MgCl_2$, 0.01 wt.% $BaCl_2$ and 0.02 wt.% $NaHCO_3$.

In order to form a polymer-microemulsion complex, from 0.1 to 10% by weight of polymer is added to the microemulsion. Alternatively, oil, water or salt water, surfactant and polymer can be admixed and agitated. It is also possible to form the complex in situ in the subterranean formation by first injecting the polymer and then the microemulsion.

The present polymer-microemulsion complexes may be employed for the chemically enhanced recovery of oil using either secondary or tertiary flooding processes. A slug containing the complex is conventionally injected through one or more injection means into the oil bearing formation in an amount effective to displace crude oil. From 0.01 to 1.0, preferably 0.1 to 0.6, pore volumes of the microemulsion complex may be injected. Larger amounts are possible, but not desirable, based on economic considerations.

It is not necessary to incorporate the polymer directly into the microemulsion. A polymer pre-flood injection with an aqueous polymer solution containing from 0.25 to 5.0% by weight of polymer may be made prior to the injection of the microemulsion slug.

In order to displace the oil towards production means which are in fluid communication with injection means, a driving fluid is used to force the microemulsion complex through the field. Water or brine are usually used for this purpose. The amounts of driving fluid may range from about 0.5, to 3 pore volumes. It is desirable for the viscosity of the driving fluid to be at least equal to that of the polymer-microemulsion complex in order to minimize any "fingering" effects that can arise when a less viscous fluid is used to displace a more viscous fluid.

Preferred driving fluids are therefore thickened water or thickened brine. Any of the conventional thickening agents can be used including water soluble polymers, e.g., polysaccharides, biopolymers such as xanthan gums, partially hydrolyzed polyacrylamides and sulfonated polyacrylamides, fatty acid detergents, alginates, sucrose, dextran, amines, glycerine and mixtures thereof. If desired, the thickened water or brine can be followed by injection of unthickened water.

From 0 to 15% by weight of co-solvents and one or more co-surfactants may optionally be incorporated into the microemulsions to assist in microemulsion formulation. Preferred co-surfactants and/or co-solvents include alcohols, ethoxylated-, sulfated ethoxylated- and sulfonated ethoxylated alcohols, all of which are $C_3$ to $C_{20}$ in the aliphatic chain as well as ethoxylated-, sulfated ethoxylated- and sulfonated ethoxylated phenols.

The unique properties of the instant polymer-microemulsion complexes are very important for the chemically enhanced recovery of oil. Prior art microemulsions typically require thickening agents to provide mobility control and eliminate fingering effects. In contrast, the present complexes require no added thickeners since their viscosities are much greater than the simple additive effects of polymer plus microemulsion that would normally be expected. This enhanced viscosifying effect is due to complex formation. If desired, however, further thickening can be achieved by adding high molecular weight polymers. It is important to note that the microemulsion viscosity can be controlled by the surfactant balance (HLB) as well as the polymer. The HLB effect can be used to suppress the viscous enhancement gained from polymer incorporation.

It is well-known that the hydrophilic-lipophilic balance (HLB) of surfactants and the stability of microemulsions are influenced by dilution and especially saline concentration. High NaCl, $Mg^{2+}$ and $Ca^{2+}$ concentrations adversely affect microemulsion stability. By complexing surfactant with polymer, it is possible to stabilize microemulsions against dilution, changing salinities and high absolute salinities, which are conditions encountered in many oil fields. It is also not necessary to achieve a precise HLB for the surfactant if phase stability is the property desired. Polymer complexation will stabilize microemulsions containing approximately balanced surfactants.

The ability of any given surfactant to form a microemulsion effective to displace oil depends in part on interfacial tension values. A maximum working value is about 0.1 dyne/cm and lower values result in a more effective displacement of oil. The effect of adding the instant polymers to microemulsions is to lower interfacial tension values up to about an order of magnitude. Phase behavior studies show that polymer complexation increases oil solubilization thereby reducing interfacial tension.

One important factor limiting the effectiveness of microemulsions in secondary or tertiary recovery techniques relates to problems associated with adsorption, particularly at high salinities. Some adsorption related phenomena are surfactant chromatography and surfactant retention.

It has been discovered that it is possible to reduce static adsorption and dynamic retention by factors of 5 to 10, i.e., the adsorption for the polymer-microemulsion complex is significantly lower than the sum of that for the surfactant alone or polymer alone. In fact, adsorptions and retention values in sand packs and cores of about 0.3 mg of surfactant/gm of sand at high salinities such as TSB have been achieved using conventional inexpensive surfactants which represents a significant advance in the art.

Phase diagram studies indicate that polymer complexation controls adsorption and retention. The phase behavior for polymer-microemulsion complexes and for polymer-free microemulsion are similar with respect to salinity and HLB dependence. Thus, the beneficial results of polymer addition are ascribed to complexation and not changes in phase behavior. At the same time, it has been discovered that the major factor for controlling cratering relates to a proper HLB for the surfactant mixture. Cratering can occur even though low retentions are achieved. In fact, the two phenomena can be controlled independently of one another.

The above-mentioned properties result in substantial benefits in recovering oil. These include an enhanced recovery due to increased surfactant efficiency, utilization of common surfactants to achieve surfactant stability at high salinities, increased production by minimizing surfactant chromatography and retention, the economic advantage of using smaller microemulsion banks due to reduced surfactant loss, and elimination of thickening agents for mobility control in the microemulsion slug.

The polymer-microemulsion complexes, properties thereof and methods of recovering oil are further described by reference to the following examples.

EXAMPLE 1

This example demonstrates that a complex is formed when polymer is added to a microemulsion. The formation of a polymer-microemulsion complex is evidenced by a relatively strong bond between the polymer and surfactant in the microemulsion and is characterized by the heat of complexation.

The heat of complexation was determined from a calorimetric study using an isothermal microcalorimeter. An on-line digital minicomputer is interfaced with a digital microvoltmeter. The computer stores the data, plots heat released as a function of time and integrates the area. This provides the heat of reaction at the bath temperature, which is regulated to within ±0.0002° C.

A microemulsion containing 2 wt.%

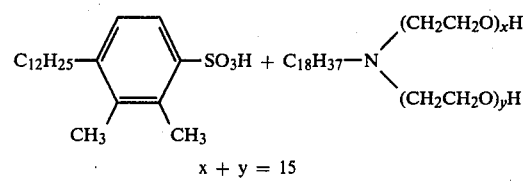

$x + y = 15$ as surfactant was temperature equilibrated together with a 4 wt.% aqueous polyethylene oxide (PEO) manufactured by Union Carbide Co. and hereinafter designated as PG20M. This product was analyzed by membrane osmometry and found to have a molecular weight of ~100,000. The surfactant solution and PEO solution were carefully mixed in the calorimeter and readings from the microvoltmeter as a function of time were stored in the microcomputer. The heat of complexation for this system was calculated to be 8.4±2 Kcal/mole.

EXAMPLE 2

This example is directed to a study of the nature of the polymer used in conjunction with microemulsions. A number of polymers were screened for ability to form complexes. The microemulsions used for screening contained 2 wt.% of a surfactant mixture of alkylphenoxypoly(ethyleneoxy) ethanol sold under the trade Igepal DM730 manufactured by GAF Corp. and the sodium salt of i-dodecyl-o-xylene sulfonic acid, 5 wt.% decane and 92 to 92.5 wt.% Tar Springs Brine. Tar Springs Brine is simulated by mixing the following in 10 l of water:

920.7 g NaCl
78.9 g CaCl$_2$
101.9 g MgCl$_2$.6H$_2$O
1.13 g BaCl$_2$.6H$_2$O
1.95 g NaHCO$_3$

The results are summarized in the following table:

TABLE I
SELECTION OF POLYMERS FOR INCORPORATION INTO MICROEMULSIONS

| Polymer | Structure | Mol. Wt. | Ability to Form Microemulsions with Ionic Surfactants |
|---|---|---|---|
| Polyvinyl Alcohol | $\text{-(CH}_2\text{-CH)}_{95\%}\text{-(CH}_2\text{-CH)}_{5\%}$ Random, with OH and O-C(=O)-CH$_3$ groups | 25,000 to 1,000,000 | None. |
| Carboxy-Methyl Cellulose | Cellulose-OCH$_2$—COOH | Very High | None. |
| Hydroxy-Ethyl Cellulose | Cellulose-OCH$_2$—CH$_2$OH | Very High | None. |
| Polyarylamide | $\text{-(CH}_2\text{-CH)-}$ with C=O, NH$_2$ | ~3 to 5 million | Very little can be incorporated across narrow range of balance-no effect on static adsorption |
| PAMPS | $\text{-(CH}_2\text{-CH)-}$ with C=O, HN—CH$_2$—CH$_2$—CH$_2$OSO$_3^-$Na$^+$ | ~3 to 5 million | Very little can be incorporated-no effect on static adsorptions |

TABLE I-continued
SELECTION OF POLYMERS FOR INCORPORATION INTO MICROEMULSIONS

| Polymer | Structure | Mol. Wt. | Ability to Form Microemulsions with Ionic Surfactants |
|---|---|---|---|
| Linear Polyethylene Oxide (PEO) | $\mathrm{-(CH_2-CH_2-O)-}$ | 4,000 to 5,000,000 | Can incorporate up to Mn~300,000- no effect or static adsorptions[1] |
| Branched PEO | $\mathrm{\sim\!\!\!\sim\!\!(CH_2CH_2O)-}$ | ~100,000 and fractions from 48,000 to 160,000 | Can incorporate significant quantities- substantial effect on static absorption |
| Polyvinyl Pyrolidene | (see structure) | 10,000 and 360,000 | Can incorporate significant quantities- substantial effect on static adsorptions |

[1] Some effect possible at very low salinity.

The data indicate that only branched PEO and linear polyvinyl pyrrolidone (PVP) of varying molecular weights substantially reduce static adsorption in high salinity brine. This correlates with an initial screening of commercially available polyethylene oxides of varying molecular weights. Of these various polymers, only a polyethylene glycol manufactured by Union Carbide (PG20M) was found to exhibit unusual properties vis-a-vis other samples. This particular polymer was the only one containing bisphenol A and epichlorohydrin which are known to promote branching.

The PG20M was fractionated using the solvent-antisolvent method by dissolving the polymer in a water-isopropanol mixture and adding increments of heptane. Six fractions were taken. The first two cuts contained about 88 wt.% of the polymer. The most highly branched material would be expected to have the lowest solubility and hence, constitute the early fractions. Average molecular weights, osmotic pressures, viscosities of microemulsions and retention in porous media were measured and only cuts 1 and 2, especially cut 1 exhibited unusual properties as compared to known linear polyethylene oxides. The molecular weight average for the first cut was above average (~160,000) and it therefore appears that fractionation occurred as a function of molecular weight as well as degree of branching. These results confirm the importance of branching for polyethylene oxide, particularly at high salinity.

EXAMPLE 3

This example illustrates the stabilizing effect of incorporating a polymer into a microemulsion system in which the hydrophilic-lipophilic balance (HLB) is not precise. The microemulsion without polymer was formulated as follows:

| Tar Springs Brine | 93.0 | ml |
|---|---|---|
| Synthetic London Crude | 7.0 | ml |
| Tertiary Amine Sulfonate (5EO/mole) | 0.66 | g |

Tertiary amine sulfonate (designated as $C_{18}TAS$) was prepared from the reaction of

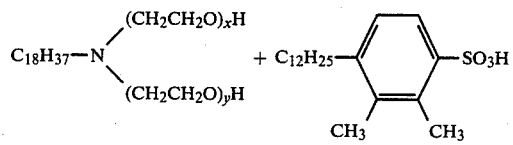

The designations 5EO and 10EO refer to $x+y=5$ and 10, respectively.

On prolonged standing, the microemulsion without polymer tended to phase separate by settling out an aqueous phase indicating that the microemulsion was not precisely balanced for the high water content and salinity. A microemulsion prepared with the addition of PG20M (1% by weight) showed no phase separation on standing indicating that the system was better balanced.

EXAMPLE 4

The viscosity and cloud point effects of adding polymer to a microemulsion are illustrated as follows. A microemulsion without polymer was formulated as described in Example 3. The viscosities of microemulsions containing varying amounts of PG20M were measured in an Ubbelohde viscometer at 25° C. with water as reference standard. The microemulsions and polyethylene oxide solutions were then combined in a 2:1 ratio.

The results are shown in FIG. 1. The dashed lines A and B represent the viscosities of PG20M solutions and microemulsions as a function of concentration. Solid line C is the calculated viscosity of a 2:1 microemulsion/polyethylene oxide mixture assuming their respective contributions are additive. Solid line D represents the actual viscosities observed from the above mixture. This considerable viscosity enhancement is supportive of the formation of a polymer-microemulsion complex.

Further evidence of complex formation is seen from a temperature dependence study. A microemulsion is formulated as in Example 3 except that $x+y=7$ and 8, respectively. The average degree of ethoxylation is 7.73 and decane is substituted for synthetic crude oil. The viscosities are again determined in Ubbelohde tubes at varying temperatures.

Figure 2:
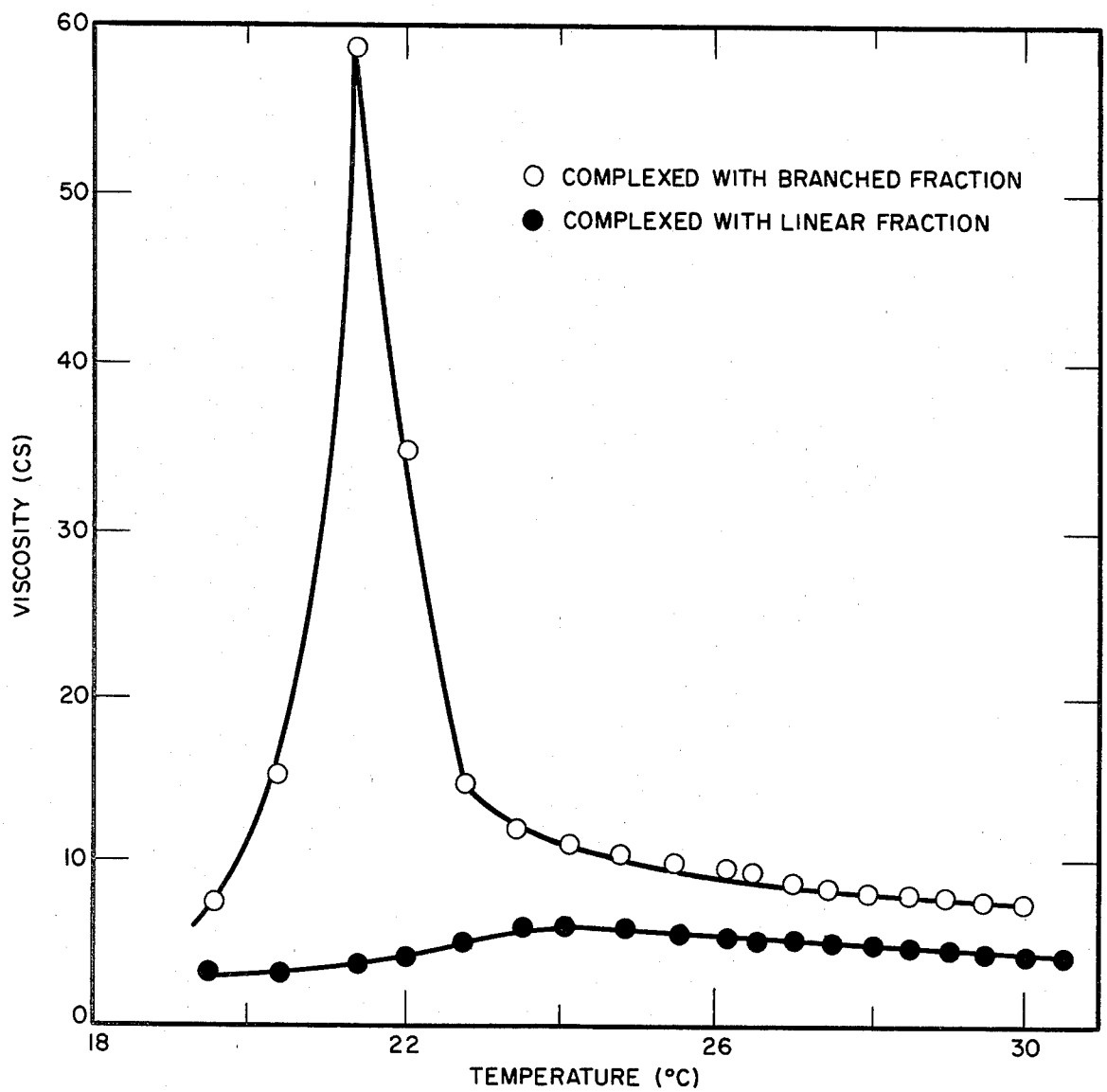
FIG. 2 is a graph illustrating the temperature dependence of viscosities of microemulsions with added polymer having differing degrees of branching.

In FIG. 2, the polymer structure appears to significantly influence the viscosity-temperature behavior of the microemulsion. Upon adding of 1 wt.% of PG20M having a molecular weight of ~160,000 and a high degree of branching (first cut of fractionation), a sharp increase in viscosity is noted at about 21.5° C. This phenomena could not have been predicted and must be attributed to a particularly strong polyethylene oxide-surfactant interaction. It has further been observed that the position and intensity of the maxima is a function of the degree of branching in polyethylene oxide. The highly branched fraction shows an intense maxima at a lower temperature ($\sim 21.5°$ C.) whereas fractions having linear fractions are largely featureless.

Figure 3:
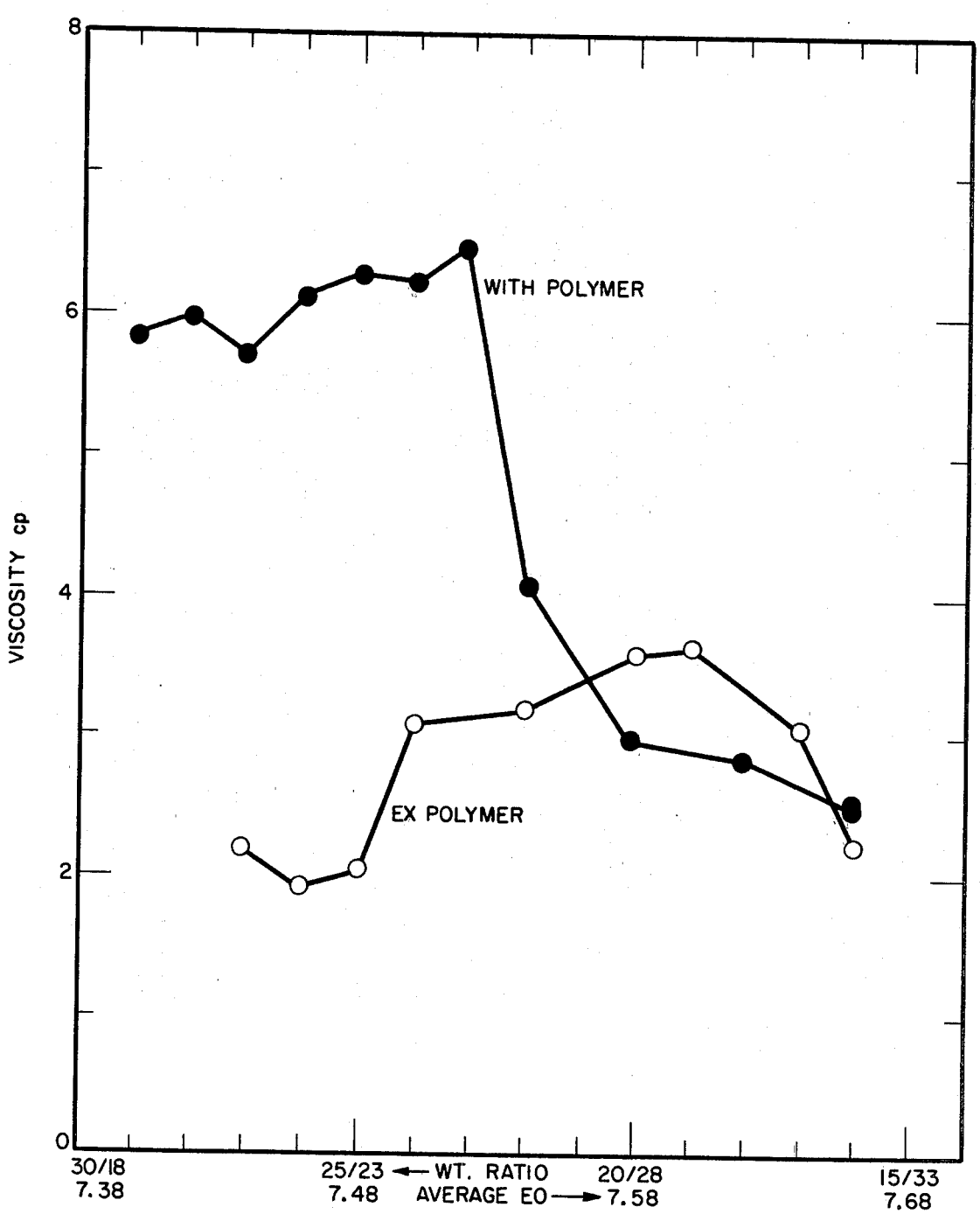
FIG. 3 is a graph showing the dependence of microemulsion viscosity on the weight ratio of surfactant and average ethylene oxide content with and without added polymer.

Further evidence for a strong polymer-surfactant interaction is seen from the dependence of viscosity (at 25° C.) on average EO content. Microemulsions were formulated with various ratios of the $x+y=7$ and 8 surfactants (2 wt.%). The results with and without added PG20M (1 wt.%) are shown in FIG. 3. A sharp increase in viscosity is noted with polymer below an average of about 7.58 EO/molecule but is absent in the polymer-free case.

Figure 4:
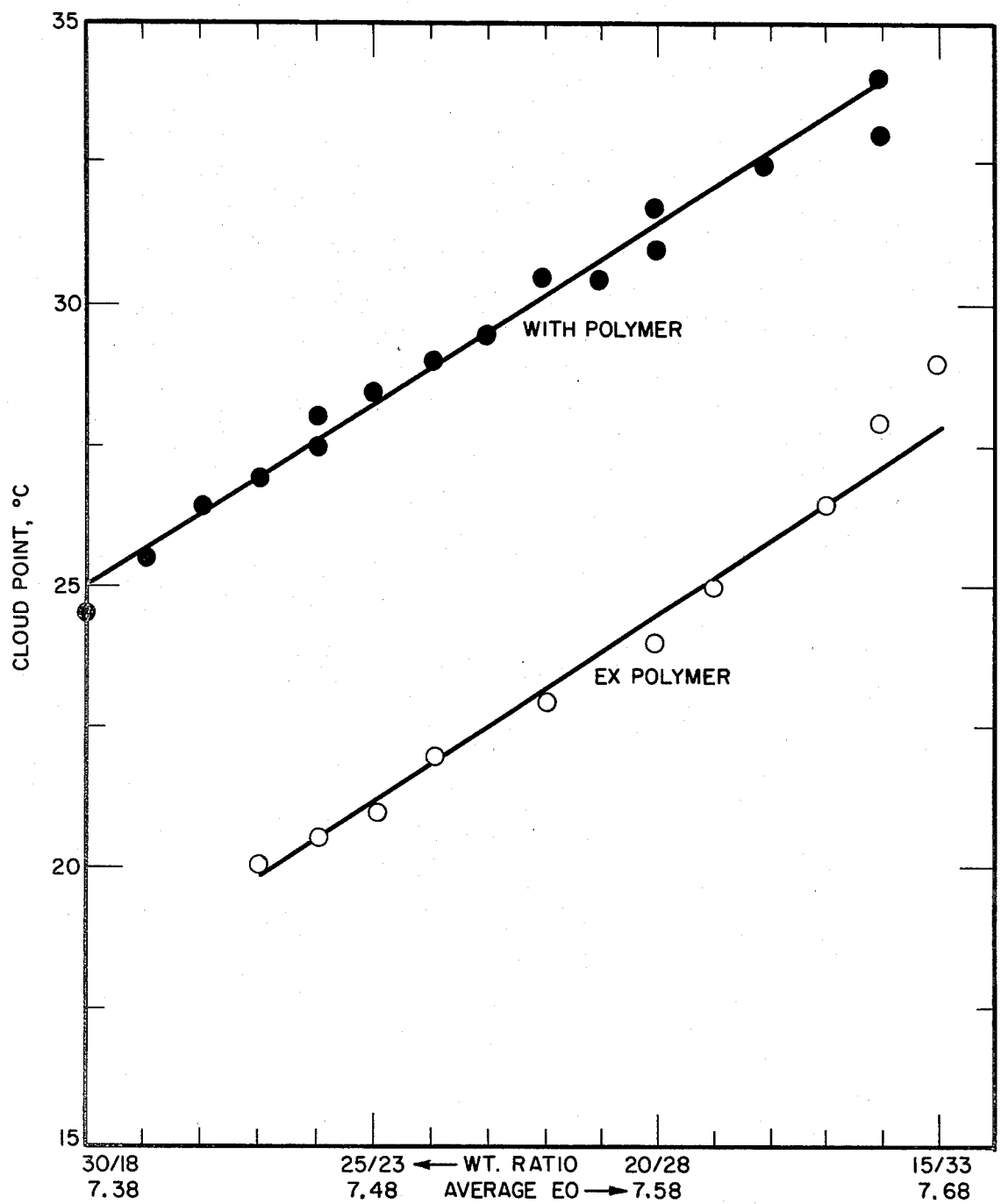
FIG. 4 is a graph comparing the cloud points of a high water content microemulsion with and without added polymer.

Cloud points are determined by heating a microemulsion until it becomes opaque and then cooling until the translucent point is reached. The transition of opaque to translucent is the cloud point and is usually sharp ($\sim 20°$ C.). The microemulsions are the same as those described in conjunction with FIG. 3. As illustrated in FIG. 4, the addition of PG20M causes an upward shift of about 7° C. in the cloud point, whereas little, if any, shift would be expected.

EXAMPLE 5

The effects of adding PEO to a microemulsion as measured by the interfacial tension (IFT) are demonstrated in this example. The IFT determinations were measured using the conventional spinning-drop method. Care was taken to allow sufficient time for each droplet under observation to reach its equilibrium configuration. Air was circulated through the sample tube to prevent heating by the strobe lamp. Other precautions include testing for frequency dependence of the IFT measurements and the accumulation of sufficient data to achieve an adequate statistical base for evaluation of experimental error.

Microemulsions were prepared containing various surfactants and varying amounts of oils and brines of different salinity. These microemulsions were measured against oil (Loudon crude or synthetic Loudon) and brine (Tar Springs Brine or 1.5 wt.% NaCl) as the contacting phase, the results are summarized in the following table.

The above IFT values vs. oil as the contacting phase for the various microemulsions not containing PEO were in the range of about $1-5 \times 10^{-3}$ dyne/cm. Upon adding polymer, a decrease of about 1 to 2 orders of magnitude in IFT is noted. It is generally accepted that the ability of a microemulsion to displace oil is inversely correlated to IFT and that values of 0.1 dyne/cm., preferably 0.01 dyne/cm or lower are desirable. The polymer complexed systems fall within the desired range.

EXAMPLE 6

This example is directed towards showing high water and oil uptake in microemulsions at high salinity, wherein the microemulsions are prepared from Tar Springs Brine (TSB). High oil and water uptake correlate with low interfacial tension and good oil recovery.

In order to determine phase uptake, six ml each of TSB and Synthetic Loudon oil are mixed with 0.24 g of the surfactant blend described in Example 3 ($x+y=5$ and 10) in an elongated test tube. In one series, the wt. ratio of the two surfactants is varied and in a second series, 0.12 g of PG20M is added. The mixture is warmed and shaken and allowed to gravity settle at room temperature (23° C.). Phase volumes of excess oil and/or water and microemulsion are measured. Volumes of oil and water in the microemulsion are calculated by difference assuming all the surfactant and polymer are in the micellar phase. The volume ratios of oil/surfactant ($V_o/V_s$) and water/surfactant ($V_w/V_s$) are plotted vs. surfactant Hydrophilic Lipophilic Balance (HLB) expressed as the wt. ratio of the two surfactants, one containing 5 and the other 10 ethylene oxide groups per molecule.

Figure 5:
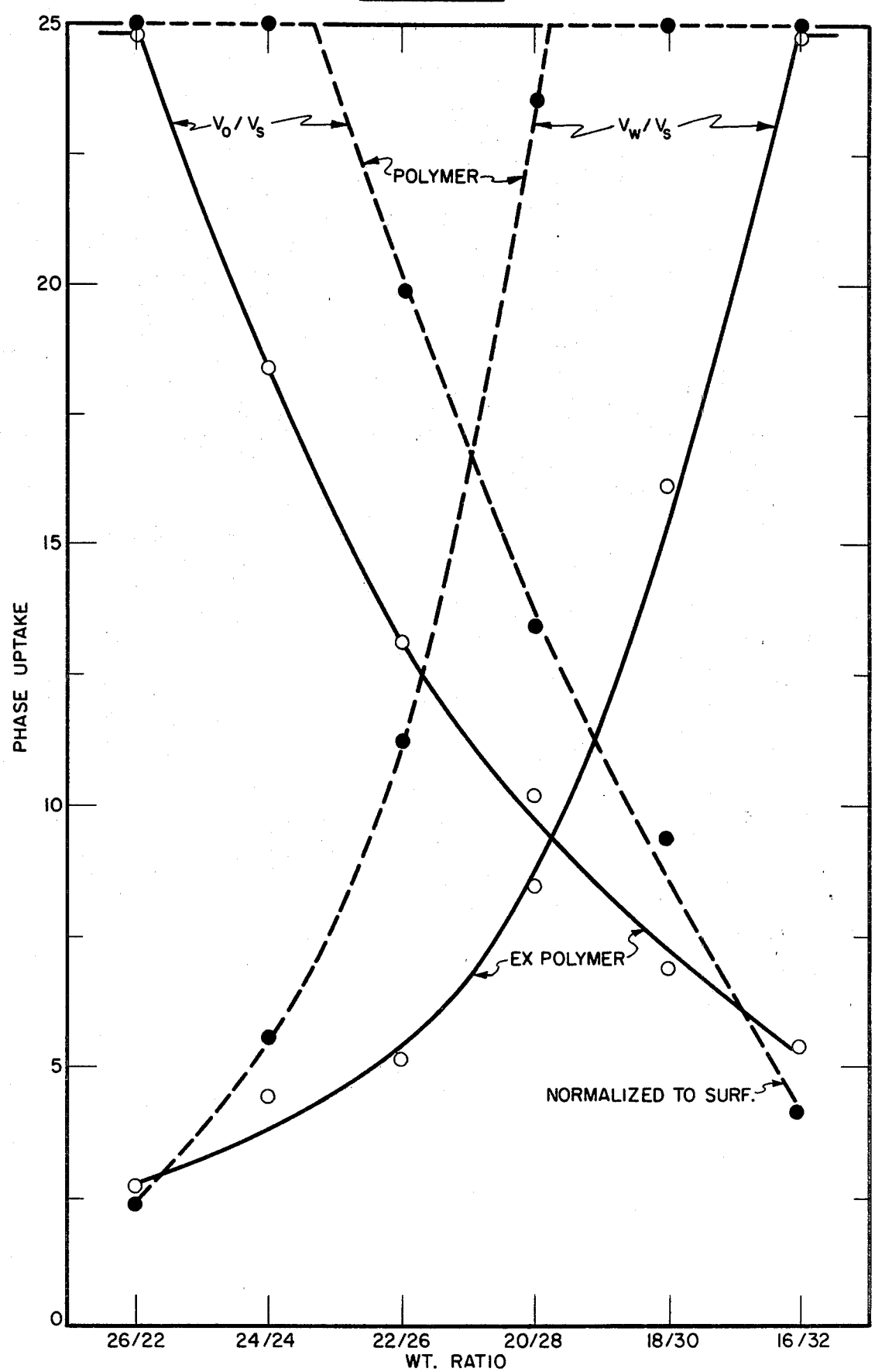
FIG. 5 is a graph showing water and oil uptake as a function of weight ratio of surfactants in a microemulsion with and without polymer.

FIG. 5 illustrates water and oil uptake as a function of the weight ratio of the two surfactants. The solid lines represent microemulsions prepared without PEO and the dashed lines represent added polymer. Without polymer, equal water and oil uptake of 9 occurs at a 20/28 wt. ratio. With polymer, equal water/oil uptake increases to 17 at a wt. ratio of 21/27. These results indicate a polymer micelle interaction by the increased phase uptake with only a small shift in HLB. The PG20M makes the microemulsion slightly more hydrophilic, i.e., it increases $V_w/V_s$ more than $V_o/V_s$. To compensate for this effect, the balance ratio ($V_w/V_s = V_o/V_s$) shifts to lower average ethylene oxide content in the surfactant blend. The much higher water-/oil uptake with polymer correlates with the reduced interfacial tension noted previously.

TABLE II

INTERFACIAL TENSIONS OF MICROEMULSIONS

| Test No. | System[1] | % Oil in Microemulsion | % Surfact. | Contacting Phase | IFT dyne/cm. |
|---|---|---|---|---|---|
| a | PL15/TAA[2] | 48.5 | 3 | 1.5% NaCl | $4.6 \times 10^{-3}$ |
| b | PL15/TAA | 48.5 | 3 | Syn. Loudon[5] | $4.0 \times 10^{-3}$ |
| c | PL15/TAA | 7.0 | 3 | Loudon Crude | $1.6 \times 10^{-3}$ |
| d | $C_{12}OXS$-18M 5/10[3] | 49.0 | 2 | Tar Spring Brine | $4.9 \times 10^{-3}$ |
| e | (d) + 1% PG20M | 48.5 | 2 | Tar Spring Brine | $1.5 \times 10^{-3}$ |
| f | (d) + 1% PG20M | 48.5 | 2 | Syn. Loudon | $0.04 \times 10^{-3}$ |
| g | $C_{12}OXS$-18M 7/8[4] | 7.0 | 3 | Loudon Crude | $15.1 \times 10^{-3}$ |
| h | (g) + 1% PG20M | 7.0 | 3 | Loudon Crude | $0.14 \times 10^{-3}$ |

[1]PL15/TAA microemulsions prepared with 1.5% NaCl. Alkyl amine sulfonate microemulsions prepared with TSB.
[2]Monoethanol amino salt of i-decyl-o-xylene sulfonic acid plus tertiary amyl alcohol.
[3]Surfactant of Example 3, i-dodecyl-o-xylene sulfonic acid and ethoxylated octadecylamine, $x + y = 5$ and 10.
[4]Surfactant of Example 3, $x + y = 7$ and 8.
[5]90 wt. % Isopar M/10 wt. % Heavy Aromatic Naphtha. These components are tradenames for paraffinic and aromatic oils manufactured by Exxon Co.

EXAMPLE 7

This example was carried out to show the reduced sensitivity of microemulsions in a high salinity environment to varying salt concentration by extending the range for high phase uptake and good sand pack performance.

The phase equilibration technique is described in Example 6, and the surfactant blend is the same except that the surfactant degree of ethoxylation is 7 and 8, respectively, instead of 5 and 10. Six ml of each of Synthetic Loudon oil and an aqueous solution of varying salinity (different % of Tar Spring Brine—TSB) was mixed with 0.24 g of surfactant blend with and without 0.12 g of 20,000 M.W. PEO and allowed to phase separate at room temperature. Water and oil uptake ($V_w/V_s$) were calculated and plotted vs. salinity (% TSB).

Figure 6:
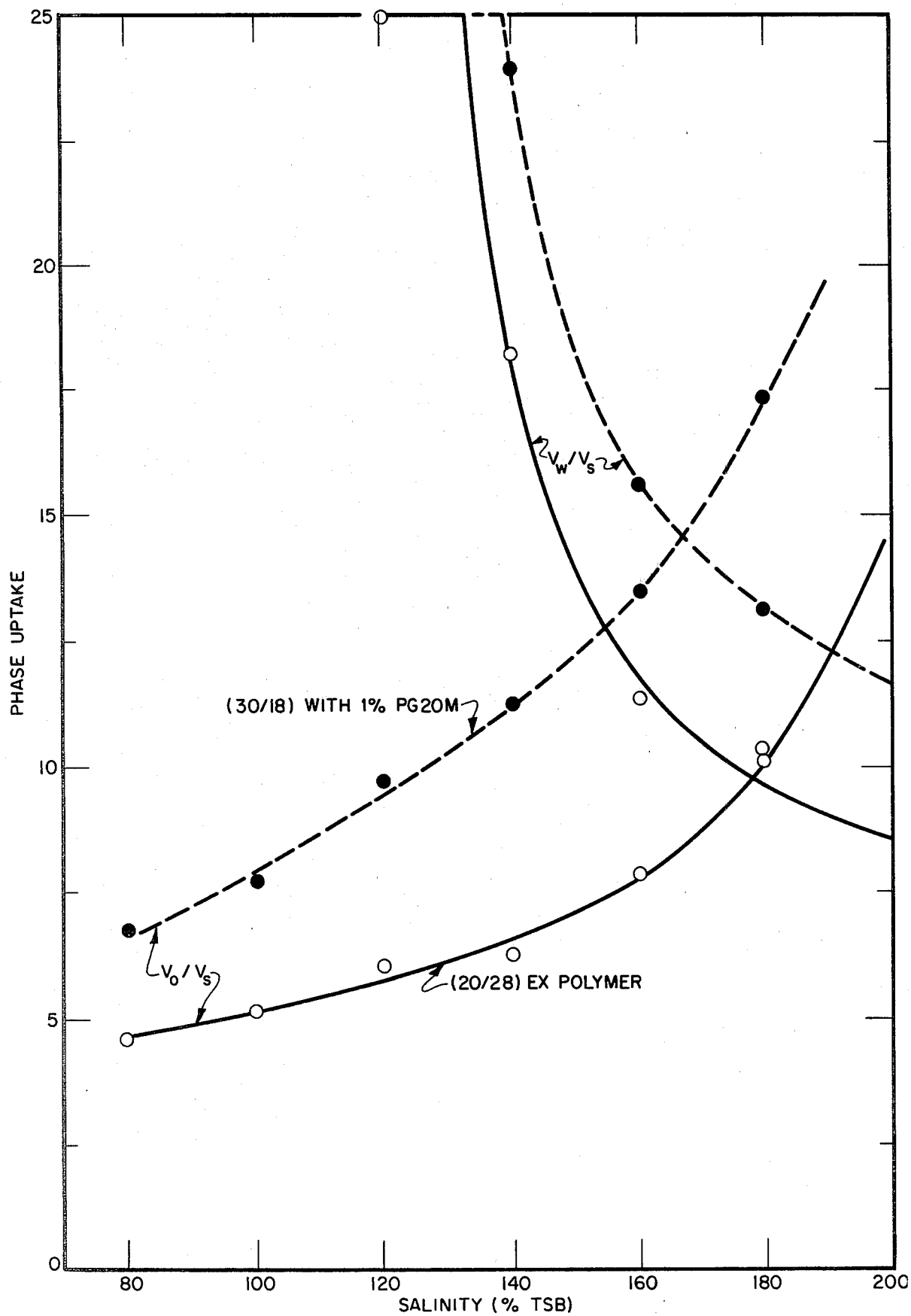
FIG. 6 is a graph showing the effects of polymer on the phase uptake as a function of salinity.

FIG. 6 describes water and oil uptake as a function of salinity for surfactant with and without PG20M over the range from 80 to 180 wt.% TSB. This particular surfactant blend gives a microemulsion cloud point of 24° C. The weight ratio of the surfactants was adjusted to accomodate the increased hydrophilicity caused by PEO incorporation. The solid line represents a 20/28 surfactant weight ratio (7.58 EO) without polymer. The dashed line is a 30/18 weight ratio (7.38 EO) plus 1 wt.% PEO (PG20M). The addition of polymer increases the phase uptake at optimum salinity ($V_w/V_s=V_o/V_s$) from about 10 to about 15. Phase uptake for the PG20M containing system remains consistently greater (~6) over the entire range of salinities studied.

Sand pack recovery tests were performed at 50, 80 and 100 wt.% TSB for a microemulsion having a 30° C. cloud point (2 wt.% surfactants, 1 wt.% PG20M, 7 wt.% Synthetic Loudon and TSB). The volume fraction of oil recovered was in the range of about 0.95 to 1 for the salinity range studied indicating that recovery was not adversely influenced by changing salinity. The experimental techniques relating to sand pack tests will be described subsequently.

EXAMPLE 8

The purpose of this example is to show that polymer-microemulsion complex formation permits improved oil recovery in a high salinity environment. As a comparative standard, the microemulsions are compared to those containing tertiary amyl alcohol plus the monoethanolamine salt of i-dodecyl-o-xylene sulfonic acid as surfactant (designated PL 15/TAA) which gives favorable oil recoveries at low (1.5 wt.% NaCl) salinities.

A representative sand pack determination was made as follows. Crushed Berea sandstone was sieved (−40+100 mesh, N.B.S. sieve numbers) and packed into a 100 ml burette with syringe fitting. After determining the weight and volume of the sand pack, air was flushed from the system, with $CO_2$ followed by flooding from the bottom with a known volume of aqueous phase. After removal of excess aqueous phase, the pore volume can be calculated from the residual aqueous phase. The volume of residual oil and residual oil saturation are determined from a sequential flood of oil and aqueous phase. The sand pack is then flooded with test microemulsion. The total volume of fluids out, the volume of oil produced, and the position of the advancing front are then measured. From this data, one can determine the fraction of oil vs. pore volume fraction and the volume fraction of sand pack swept clean vs. pore volume fraction.

Figure 7:
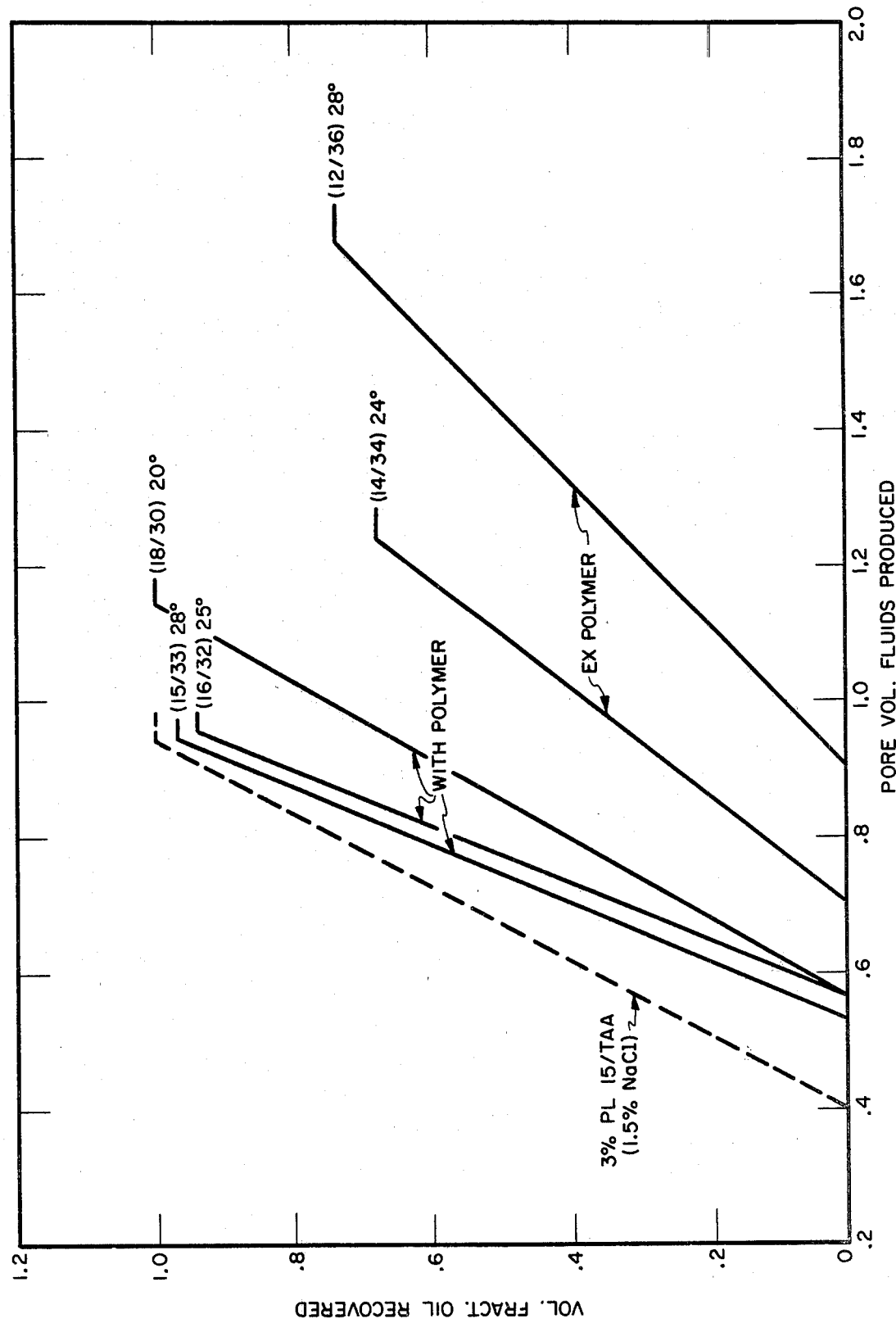
FIG. 7 is a graph of sand pack oil recovery at high salinity illustrating the effect of polymer and surfactant HLB versus a low salinity base case.

FIG. 7 is a graph showing sand pack recovery as a function of the nature of the microemulsion and surfactant HLB. The microemulsions and weight ratios, e.g., (15/33) 28°, are described in Example 6. The temperature designation represents the cloud point. The solid lines are microemulsions containing surfactant (2 wt.%), oil (7 wt.%) in TSB with and without PG20M (1 wt.%) and the dashed line represents the comparative standard PL 15/TAA in a low salinity (1.5 wt.% NaCl) microemulsion containing 3 wt.% of surfactant. In the absence of polymer, performance is poor, i.e., approximately 70% recovery at pore volumes substantially in excess of 1. The addition of polymer increases the recovery to about 95 to 100% at pore volumes generally less than 1.0. Moreover, the addition of polymer drastically reduces the effect of changing surfactant HLB. Similar results are achieved when polyvinyl pyrrolidone is used as the polymer.

EXAMPLE 9

The following series of experiments were conducted to demonstrate that adsorption and retention values of about 0.3 mg of surfactant/gm of sand or rock can be achieved in high salinities which values do not increase with dilution.

Adsorption and retention measurements were made in sand packs, preparation of which are described in Example 8, and in Berea Sandstone cores. The cores are coated with an epoxy resin, flooded with Tar Springs Brine (TSB), saturated with oil and again flooded with TSB to irreducible oil saturation. The cores are then ready for the test solution.

Adsorptions on crushed Berea sandstone were determined for PG20M polymer, sodium i-dodecyl-o-xylene sulfonate designated as $C_{12}OXSNa$, Igepal DM 730 which is a tradename for di-nonylphenol containing 24 —$CH_2CH_2O$— groups and manufactured by GAF Corp. and mixtures thereof. The results for microemulsions containing the above surfactants are set forth in Table III.

TABLE III

| ADSORPTION IN TAR SPRINGS BRINE | | |
|---|---|---|
| System | Blend Ratio | Adsorption mg/ gm sand |
| IGEPAL DM 730 | | 1.0 |
| $C_{12}OXSNa$ | | Insoluble in TSB |
| PG20M | | 3.4 |
| $C_{12}OXSNa$/DM730/ | 1.2/1.3/0/7 | 2.47 |
| PG20M/Decane | 1.27/1.23/0.5/7 | 0.54 |
| | 1.32/1.18/1.0/7 | 0.28 |
| | 1.35/1.15/1.25/7 | 0.30 |

The data indicate that static adsorptions minimize at about 1.0 wt.% polymer and that it is possible to achieve a reduction in adsorption of about an order of magnitude.

Figure 8:
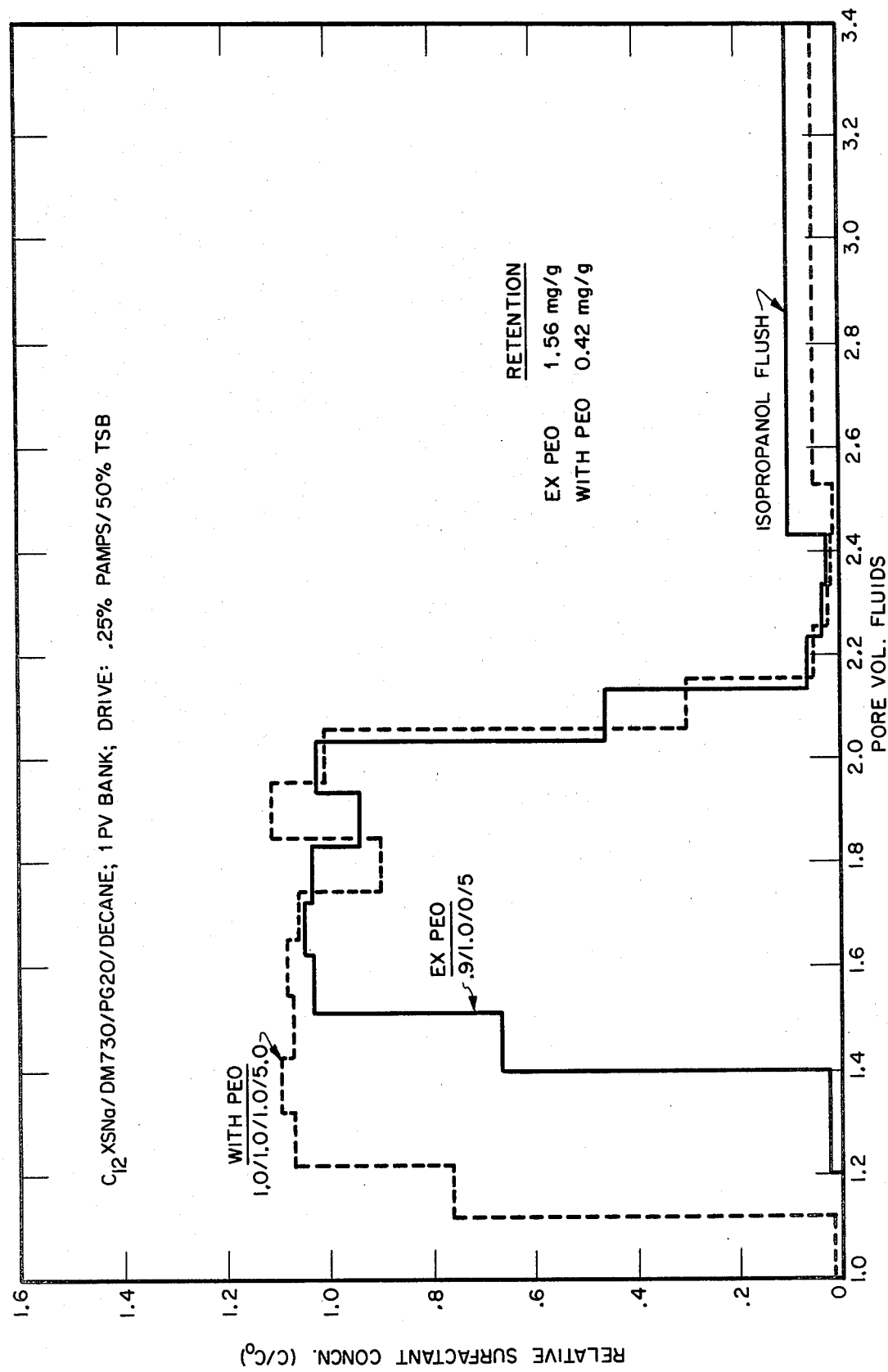
FIG. 8 is a graph demonstrating the effect of polymer on dynamic retention in sand packs.

Retention in Berea sand packs was determined for a $C_{12}OXSNa$/Igepal DM730/decane microemulsion in TSB with and without 1 wt.% PG20M driven by 0.25% PAMPS (see Table I for structure) in 50% TSB. FIG. 8 shows that without polymer, a 2 wt.% surfactant system has a retention four times greater than the polymer-containing microemulsion.

When ethoxylated amines are used in microemulsions a pretreatment of the surfactant may assist in reducing adsorption. The pretreatment consists of "purifying"

the surfactant prior to complexation with polymer. The purification treatment involves dissolving the surfactant system in Tar Springs Brine and contacting this solution with a large excess of crushed Berea sand, e.g., 50:1 sand:surfactant. Such a procedure results in loss of original surfactant followed by equilibration after the first contact.

Results for the surfactant system:

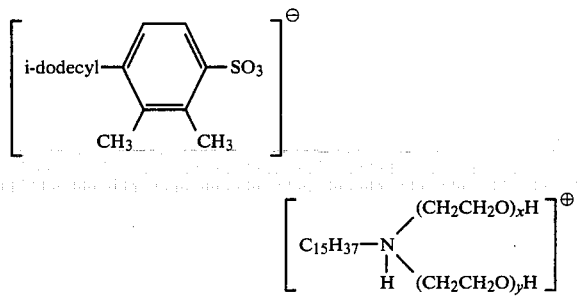

are summarized in Table IV.

TABLE IV
PURIFICATION OF SURFACTANTS-EFFECT ON ADSORPTION

| System Surfactant EO Units | Adsorption Levels, mg/g Sand | | |
|---|---|---|---|
| x + y | Original | 1st Contact | 2nd Contact |
| 5 EO | 10 | 6 | — |
| 7 EO | 2.94 ± 0.7 | 1.35 ± 0.3 | 1.30 |
| 8 EO | 2.83 ± 0.5 | 1.46 ± 0.2 | 1.40 |
| 10 EO | 2.70 | 1.1 | 1.1 |
| 15 EO | 2.1 ± 0.3 | 1.44 ± 0.1 | — |

The "purified" and "nonpurified" surfactants are then used to prepare microemulsions with and without polyethylene oxide (PG20M). Adsorption data are described in Table V.

TABLE V
ADSORPTION OF MICROEMULSIONS FROM COMBINED SURFACTANT SYSTEMS

| System* | Composition* | Adsorption Level mg/g Sand |
|---|---|---|
| Non-purified 7/8 non-complexed | 2% 7/8, 7% decane 93% TSB | 5 ± 1 |
| Non-purified 7/8 polymer complexed | 2% 7/8, 7% decane 1% PG20M, 93% TSB | 1.3 ± 0.4 |
| Purified 7/8 non-complexed | 2% 7/8, 7% decane, 93% TSB | 1.9 ± .1 |
| Purified blend (7/8) polymer complexed | 2% 7/8, 7% decane 1% PG20M, 93% TSB | .3 ± .15 |

*7/8 = Blend of x + y = 7 with x + y = 8 and a ratio of 22/20.

These data demonstrate that the level of adsorption for "purified" or "nonpurified" surfactants is substantially lowered and that by adding polymer, it is possible to achieve the target adsorption value of 0.3 mg surfactant/mg sand.

Figure 9:
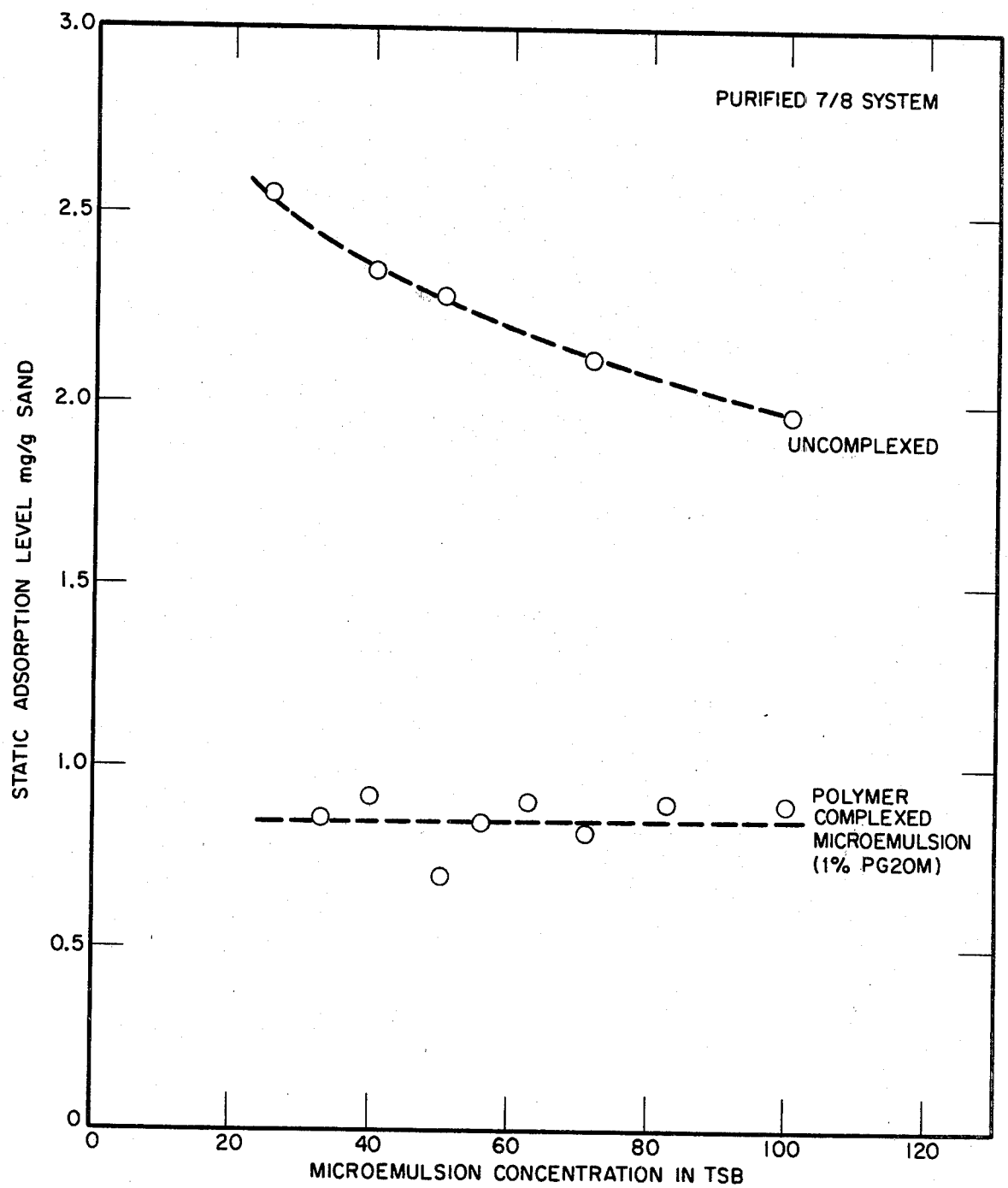
FIG. 9 is a graph of the effect of dilution with brine on the static adsorption of complexed and non-complexed microemulsions.

If a microemulsion as described in Table V and containing purified ⅞ surfactant is diluted with TSB, then the addition of polymer further demonstrates the stabilizing effects of complex formation. FIG. 9 is a graph of static adsorptions of surfactant from microemulsions prepared by diluting with TSB a microemulsion containing 2 wt.% of surfactant (x+y=8; 7 wt.% decane) with and without polyethylene oxide (1 wt.% PG20M). The noncomplexed microemulsion shows a higher adsorption which increased on dilution whereas the complexed system is unaffected.

Dynamic adsorption and retention values were then determined in 2 ft. Berea sandstone cores. The cores were prepared as described above to contain in one case, connate TSB water and in a second case, residual decane at 32% pore volume. The microemulsion contains a surfactant blend of 0.77 wt.% of the sodium salt of $C_{12}$-o-xylene sulfonic acid ($C_{12}$XSNa), 1.23 wt.% of surfactant designated EO15 in Table IV, 5 wt.% decane, 1.5 wt.% of PG20M as polymer and the balance is TSB. The cores were flooded with 1 pore volume (PV) of microemulsion followed by 1 PV of 0.25 wt.% of PAMPS (See Table 1) in 100% TSB. The system was then flushed by 2 PV of isopropanol.

Figure 10:
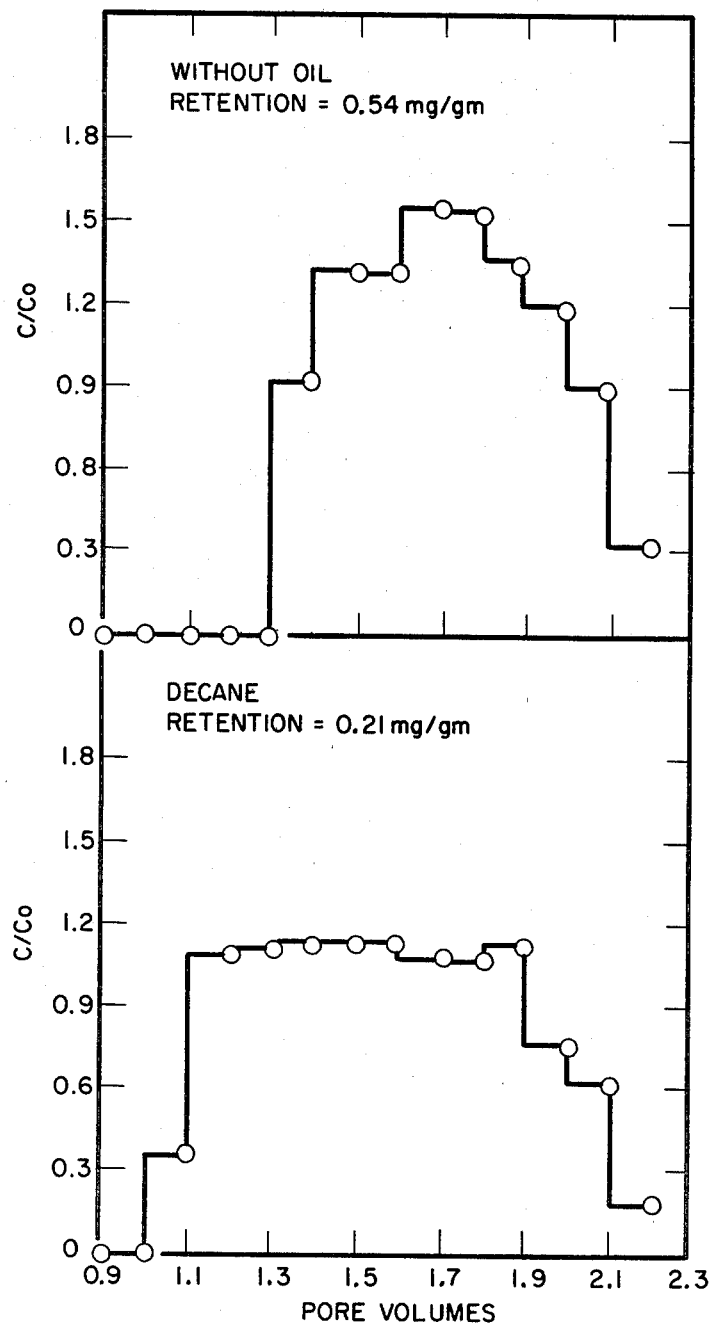
FIG. 10 is a graph of the effect of residual oil on microemulsion cratering.

The effluent from the cores were analyzed and the data in the form of normalized concentration of microemulsion ($c/c_o$) vs. pore volume are shown in FIG. 10. The upper graph indicates that in the absence of oil in the core, cratering is a problem as evidenced by the late appearance of microemulsion (1.4 PV). If oil is present in the core, retention values can be lowered from 0.54 to 0.21 mg of surfactant/gm of rock and cratering is reduced since the microemulsion appears at 1.1 PV.

EXAMPLE 10

Figure 11:
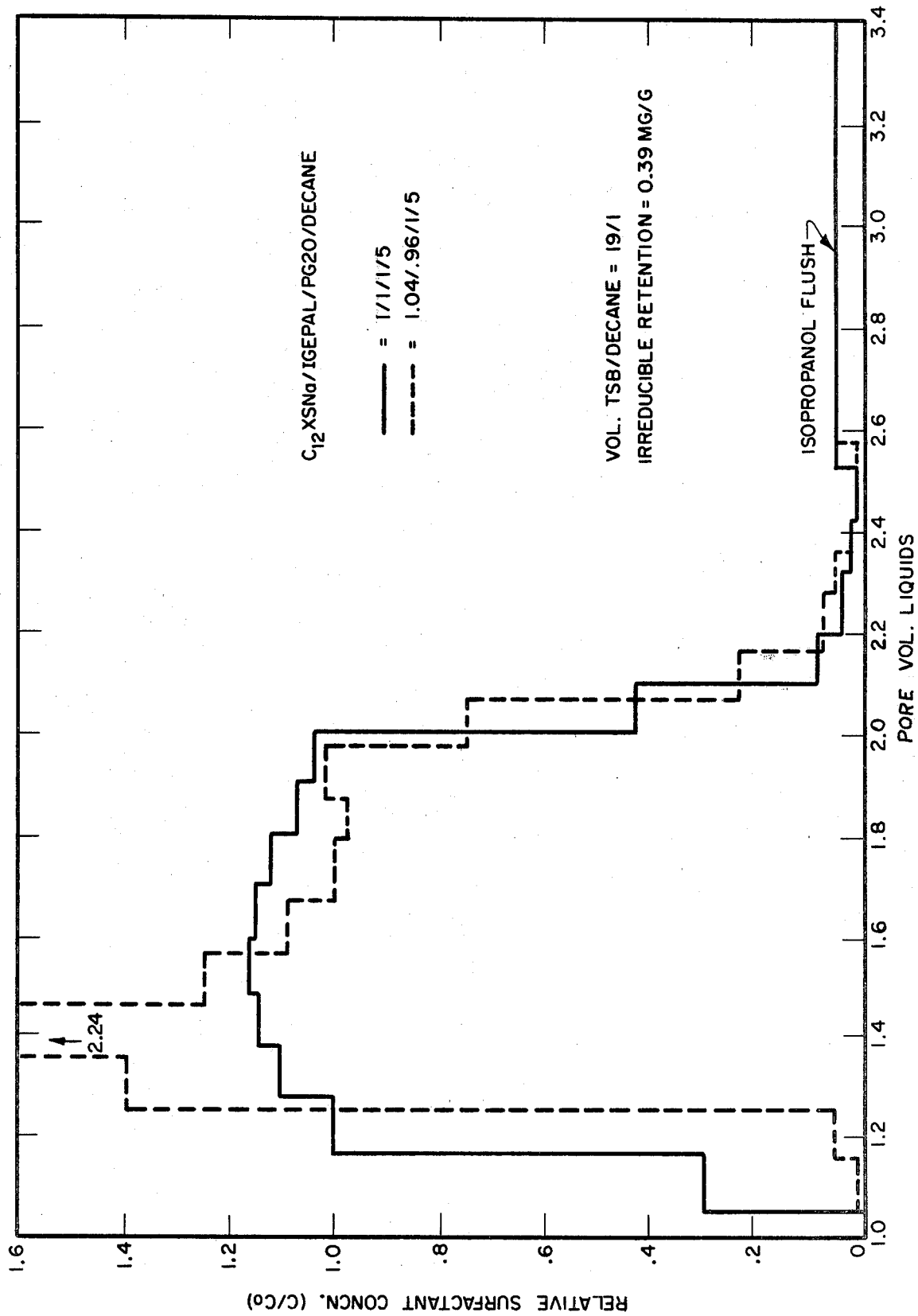
FIG. 11 is a graph illustrating cratering caused by changing the HLB of the surfactant system.

The dependence of cratering as a function of surfactant HLB is described in this example. FIG. 11 is a graph showing the effects of changing the relative amounts of hydrophilic and lipophilic surfactants in a microemulsion. The surfactant system is that described in Example 9 and Table III. The solid line represents the system $C_{12}$XSNa/DM730/PG20M/decane in a ratio of 1/1/1/5, whereas the dashed line represents a ratio of 1.04/0.96/1/5. The volume ratio of TSB to decane was 19/1. An irreducible retention of 0.39 mg surfactant/g of sand was found in both cases.

Lowering the hydrophilic/lipophilic ratio results in a dramatic increase in the cratering effect. Cratering results in delayed appearance of the microemulsion and surfactant buildup at the leading edge of the microemulsion slug and this is reflected in the large peak for the surfactant concentration ($C/C_o$) at the leading edge of the microemulsion represented by the dashed line.

Base on the data of Examples 8 and 9 and the fact that the phase diagrams for polymer complexed and polymer free microemulsion are quite similar, it appears that polymer complexation is the dominant factor controlling adsorption and retention whereas surfactant HLB regulates cratering. Moreover, the beneficial results of polymer addition are the result of complexation and are not due to changes in phase diagram.

EXAMPLE 11

It is not necessary to incorporate the polymer directly into the microemulsion to improve oil recovery, i.e., a polymer preflood may precede the microemulsion.

Berea sand columns packed to a porosity of about 36% were filled with Tar Springs Brine and purged with Loudon crude oil. The initial oil saturation ranged between 55 and 60 pore volume percent. After water flooding with TSB, the oil saturation was reduced to about 24 pore volume percent. Next, the watered-out columns were purged with solutions of 1 wt.% of polyethylene oxide (PG20M) in TSB until the effluent viscosities matched those of the injected solutions. No additional oil was produced during this step. The microemulsion described in Example 3 without polymer was then injected.

Figure 12:
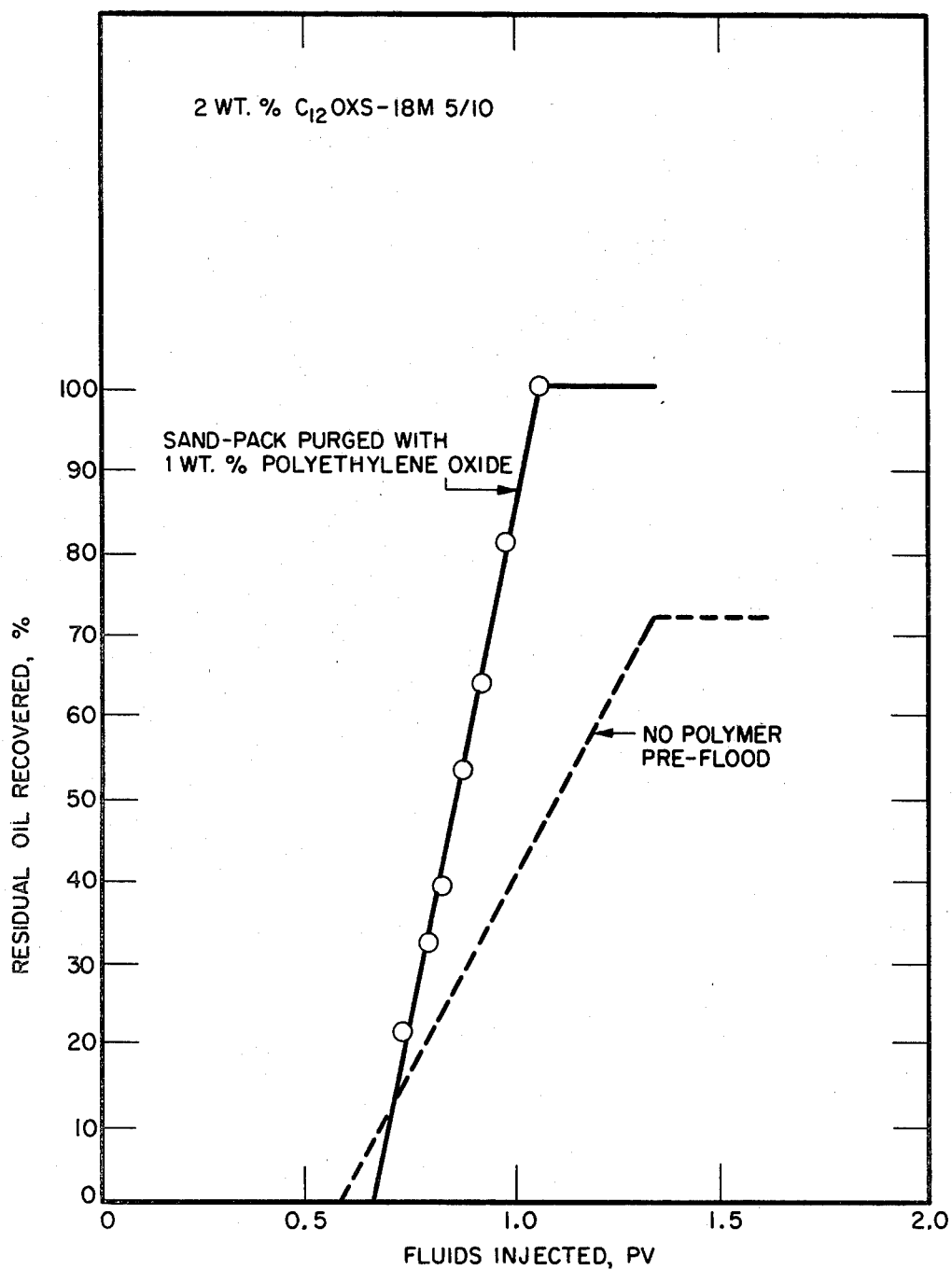
FIG. 12 is a graph demonstrating the effects of a polymer preflood on oil recovery.

FIG. 12 is a graph showing the effects on sand pack recovery of injecting a microemulsion with and without a polymer preflood. The solid line represents a sand pack purged with 1 wt.% PG20M followed by microemulsion. The dashed line represents injection of microemulsion without a polymer preflood. With a polymer preflood, a 100% residual oil recovery was obtained vs. a 72% recovery with microemulsion alone.

What is claimed is:

1. A process for recovering crude oil from a subterranean formation which comprises injecting into the formation a stabilized microemulsion system which contains a polymer-microemulsion complex in an amount effective to displace oil, said microemulsion system comprising
   (a) a microemulsion containing as components
      (1) an oil,
      (2) water having up to 25% by weight of dissolved inorganic salts, and
      (3) 0.2 to 15 wt. %, based on the microemulsion, of at least one anionic surfactant balanced to form the microemulsion, and
   (b) from 0.1 to 10% by weight, based on the microemulsion of a polar polymer capable of forming a polymer-microemulsion complex wherein the polar polymer has a molecular weight of from 4,000 to 5,000,000 and is selected from the group consisting of branched polyethylene oxide condensation product of polyethylene oxide, bisphenol A and epichlorohydrin and polyvinyl pyrrolidone, the polymer-microemulsion complex being characterized by a complexation energy of at least 2 Kcal/mole, driving the microemulsion system through the formation to displace oil, and recovering the resultant crude oil.

2. The process of claim 1 wherein the microemulsion contains from 0.3 to 98 wt.% component (1), 1 to 99 wt.% component (2), and 0.2 to 15 wt.% component (3).

3. The process of claim 1 wherein the complexation energy is from about 5 to 15 Kcal/mole.

4. The process of claim 1 wherein component (2) contains from about 1 to 14 wt.% based on water of dissolved inorganic salts.

5. The process of claim 1 wherein component (1) is a sweet or sour crude; synthetic crude; refined fraction such as kerosene, diesel oil, lube oil, aromatic naphtha or white oil boiling at from 80° to 345° C.; $C_6$ to $C_{22}$ aliphatic hydrocarbon; aromatic hydrocarbon boiling at from 80° to 300° C.; or mixtures thereof.

6. The process of claim 1 wherein component (3) is a mixture of an anionic surfactant with at least one other anionic, nonionic or cationic surfactant.

7. The process of claim 6 wherein the anionic surfactant or cosurfactant is a sulfonate or sulfate.

8. The process of claim 7 wherein the sulfonate has the formula $$[R^1\text{—}SO_3]^\oplus Y^\ominus$$

where $R^1$ is $C_8$ to $C_{25}$ aliphatic, $C_{14}$ to $C_{36}$ alkylaryl or $R^2\text{—}(OCH_2CH_2)_n$ where $R^2$ is the same as $R^1$ and n is an integer from 1 to 60, and Y is hydrogen, alkali metal cation or $N(R^3)_4^\oplus$ where each $R^3$ is independently hydrogen, alkyl of 1 to 4 carbon atoms or hydroxy alkyl of 1 to 4 carbon atoms.

9. The process of claim 7 wherein the sulfate has the formula $$[R^4\text{—}O\text{—}SO_3]^\ominus Y^\oplus$$

where $R^4$ is $C_8$ to $C_{25}$ aliphatic, $C_{14}$ to $C_{38}$ alkylaryl or $R^5\text{—}(OCH_2CH_2)_n$ where $R^5$ has the same definition as $R^4$ and n is an integer from 1 to 60, and Y is hydrogen, alkali metal cation or $N(R^3)_4^\oplus$ where each $R^3$ is independently hydrogen, alkyl of 1 to 4 carbon atoms or hydroxy alkyl of 1 to 4 carbon atoms.

10. The process of claim 6 wherein the mixture contains dodecylxylene sulfonate or dodecylbenzene sulfonate as the anionic surfactant.

11. The process of claim 6 or 10 wherein the nonionic cosurfactant is an ethoxylated $C_8$ to $C_{25}$ alkanol or an ethoxylated phenol of the formula $$(R^6)_r\text{—}A\text{—}[O(CH_2CH_2O)_p]_qH$$

where $R^6$ is $C_1$ to $C_{24}$ alkyl, A is benzene, P is 2 to 60, q is 1 or 2 and r is 1 to 5 with the proviso that when R is 1, $R^6$ is at least $C_8$.

12. The process of claim 10 wherein the nonionic cosurfactant is an ethoxylated $C_8$ to $C_{24}$ alkylphenol.

13. The process of claim 12 wherein the nonionic cosurfactant is an ethoxylated octyl, -nonyl or -dodecyl phenol containing 8 to 24 —$CH_2CH_2O$— groups.

14. The process of claim 10 wherein the anionic cosurfactant is a sulfated ethoxylated $C_{12}$ to $C_{16}$ alkanol or sulfonated ethoxylated $C_8$ to $C_{26}$ alkylphenol.

15. The process of claim 10 wherein the anionic cosurfactant is a sulfonated ethoxylated dinonyl phenol containing 8 to 50 —$CH_2CH_2O$— groups.

16. The process of claim 6 or 10 wherein the nonionic or cationic cosurfactant is a $C_8$ to $C_{30}$ alkylamine, $C_8$ to $C_{30}$ ethoxylated alkylamine or the respective quaternary ammonium salts thereof.

17. The process of claim 10 wherein the nonionic or cationic cosurfactant has the formula $$C_mH_{2m+1}\text{—}N\begin{matrix}(CH_2CH_2O)_uH \\ (CH_2CH_2O)_vH\end{matrix}$$

where m is from 8 to 25 and the sum of u+v is from 2 to 20.

18. The process of claim 6 wherein the anionic surfactant and cosurfactant have hydrophilic and lipophilic properties which are balanced.

19. The process of claim 1 wherein the microemulsion is driven through the formation with a thickened water or brine.

20. The process of claim 1 wherein a cosolvent is incorporated into the microemulsion.

21. The process of claim 1 wherein the microemulsion system is injected as a 0.01 to 1.0 pore volume slug.

22. The process of claim 1 wherein the microemulsion is anisotropic and birefringent.

23. A process for recovering crude oil from a subterranean formation which comprises injecting into the formation an aqueous solution containing from 0.25 to 5 wt. % of a polar polymer having a molecular weight of from 4,000 to 5,000,000 and selected from the group consisting of branched polyethylene oxide condensation product of polyethylene oxide, bisphenol A and epichlorohydrin and polyvinyl pyrrolidone, a microemulsion containing an oil, water having up to 25 wt. % of dissolved inorganic salts and from 0.2 to 15 wt. % of at least one anionic surfactant balanced to form the microemulsion whereby a polymer-microemulsion complex is formed in-situ, said complex being characterized by a complexation energy of at least 2 Kcal/mole, driving the polymer-microemulsion complex through the formation to displace oil and recovering the resultant oil.

24. A process for recovering crude oil from a subterranean formation which comprises injecting into the formation a stabilized microemulsion system which contains a polymer-microemulsion complex in an amount effective to displace oil, said microemulsion system comprising
(a) a microemulsion containing as components
  (1) an oil,
  (2) water having up to 25% by weight of dissolved inorganic salts, and
  (3) 0.2 to 15 wt. % based on the microemulsion of at least one anionic surfactant balanced to form the microemulsion, and
(b) from 0.1 to 10% by weight, based on the microemulsion of a polar polymer capable of forming a polymer-microemulsion complex wherein the polar polymer is a branched polyethylene oxide condensation product of polyethylene oxide, bisphenol A and epichlorohydrin having a molecular weight of from 10,000 to 500,000, the polymer-microemulsion complex being characterized by a complexation energy of from about 5 to 15 Kcal/mole, driving the microemulsion system through the formation to displace oil, and recovering the resultant crude oil.

* * * * *